United States Patent
Ohtsuka et al.

(10) Patent No.: US 12,521,006 B2
(45) Date of Patent: Jan. 13, 2026

(54) INTRAORAL CAMERA SYSTEM AND IMAGE CAPTURING OPERATION DETERMINATION METHOD

(71) Applicant: Panasonic Intellectual Property Management Co., Ltd., Osaka (JP)

(72) Inventors: Yoshio Ohtsuka, Osaka (JP); Masato Izawa, Osaka (JP); Tomoki Ogawa, Osaka (JP); Toshiyuki Nakashima, Nara (JP); Masayuki Aihara, Osaka (JP); Kazuhiro Funamoto, Hyogo (JP); Tadashi Miki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 398 days.

(21) Appl. No.: 18/033,718

(22) PCT Filed: Feb. 17, 2022

(86) PCT No.: PCT/JP2022/006361
§ 371 (c)(1),
(2) Date: Apr. 25, 2023

(87) PCT Pub. No.: WO2022/176942
PCT Pub. Date: Aug. 25, 2022

(65) Prior Publication Data
US 2023/0329538 A1 Oct. 19, 2023

(30) Foreign Application Priority Data
Feb. 22, 2021 (JP) .................. 2021-026107

(51) Int. Cl.
*A61B 1/24* (2006.01)
*A61C 19/04* (2006.01)
*G06T 7/70* (2017.01)

(52) U.S. Cl.
CPC ............... *A61B 1/24* (2013.01); *A61C 19/04* (2013.01); *G06T 7/70* (2017.01)

(58) Field of Classification Search
USPC ........................................ 382/128
See application file for complete search history.

(56) References Cited

U.S. PATENT DOCUMENTS 9,510,757 B2 * 12/2016 Kopelman ............. A61B 6/469
2006/0212260 A1 * 9/2006 Kopelman ............. G16H 50/50
702/152

(Continued)

FOREIGN PATENT DOCUMENTS

JP 2012-217762 A 11/2012
JP 2016-529959 A 9/2016

(Continued)

OTHER PUBLICATIONS

Extended European Search Report dated Jul. 1, 2024 issued in the corresponding European Patent Application No. 22756260.0.

(Continued)

*Primary Examiner* — Jacky X Zheng
(74) *Attorney, Agent, or Firm* — Rimon P.C.

(57) ABSTRACT

An intraoral camera system includes an imaging unit and an image determination unit. The imaging unit generates an image data item showing a target tooth for image capturing inside a mouth. The image determination unit defines two-dimensional plane coordinates for the image data item generated by the imaging unit and extracts the position coordinates of the outline of the target tooth from the entire imaging area of the imaging unit. When a part of the outline of the target tooth is outside an effective area set inside the entire imaging area of the imaging unit, the image determination unit determines that the target tooth extends beyond the effective area.

14 Claims, 20 Drawing Sheets

(56) References Cited

U.S. PATENT DOCUMENTS

2013/0130191 A1    5/2013   Iio et al.
2013/0286174 A1   10/2013   Urakabe
2015/0017598 A1    1/2015   Wu et al.
2018/0374226 A1   12/2018   Cocco et al.

FOREIGN PATENT DOCUMENTS

WO    2012/086134 A1    6/2012
WO    2012/096312 A1    7/2012
WO    2015/006518 A1    1/2015

OTHER PUBLICATIONS

International Search Report issued on May 17, 2022 in International Patent Application No. PCT/JP2022/006361, with English translation.

\* cited by examiner

INTRAORAL CAMERA SYSTEM AND IMAGE CAPTURING OPERATION DETERMINATION METHOD

CROSS-REFERENCE OF RELATED APPLICATIONS

This application is the U.S. National Phase under 35 U.S.C. § 371 of International Patent Application No. PCT/JP2022/006361, filed on Feb. 17, 2022, which in turn claims the benefit of Japanese Patent Application No. 2021-026107, filed on Feb. 22, 2021, the entire disclosures of which Applications are incorporated by reference herein.

TECHNICAL FIELD

The present disclosure relates to an intraoral camera system and an image capturing operation determination method.

BACKGROUND ART

Patent Literature (PTL) 1 discloses a method of obtaining an image of a tooth inside a mouth.

CITATION LIST

Patent Literature

[PTL 1] Japanese Unexamined Patent Application Publication No. 2012-217762

SUMMARY OF INVENTION

Technical Problem

It is desirable that the accuracy of image capturing when capturing an image of a tooth be improved.

In view of this, the present disclosure aims to provide an intraoral camera system and an image capturing operation determination method which are capable of improving the accuracy of image capturing.

Solution to Problem

An intraoral camera system according to one aspect of the present disclosure includes an imaging unit that generates an image data item showing a target tooth for image capturing inside a mouth, a position coordinate extractor that defines two-dimensional plane coordinates for the image data item generated by the imaging unit and extracts the position coordinates of the outline of the target tooth from the entire imaging area of the imaging unit, and an image determination unit that determines, when part of the outline of the target tooth is outside an effective area set inside the entire imaging area of the imaging unit, that the target tooth extends beyond the effective area.

Advantageous Effects of Invention

The present disclosure can provide an intraoral camera system and an image capturing operation determination method which are capable of improving the accuracy of image capturing.

DESCRIPTION OF EMBODIMENTS (Circumstances Leading to the Present Disclosure)

Underlying knowledge forming the basis of the present disclosure is described before description of an embodiment of the present disclosure.

When a user captures images of their teeth by an intraoral camera, it is difficult for the user to notice a failure even if the trajectory of a series of images being captured deviates from an operation trajectory (trajectory to capture necessary dentition images). For instance, when capturing an image of a molar by an intraoral camera, the user performs image capturing by pushing their cheek outward. In this case, by pushing their cheek outward, the user can bring the intraoral camera into contact with the tooth in a stable state. However, when the user stops pushing their cheek outward to move the intraoral camera toward anterior teeth from the current image capturing position, or because of, for example, movement of their cheek, a camera shake may occur, and the intraoral camera may deviate from the proper operation trajectory along the dentition.

Figure 1:
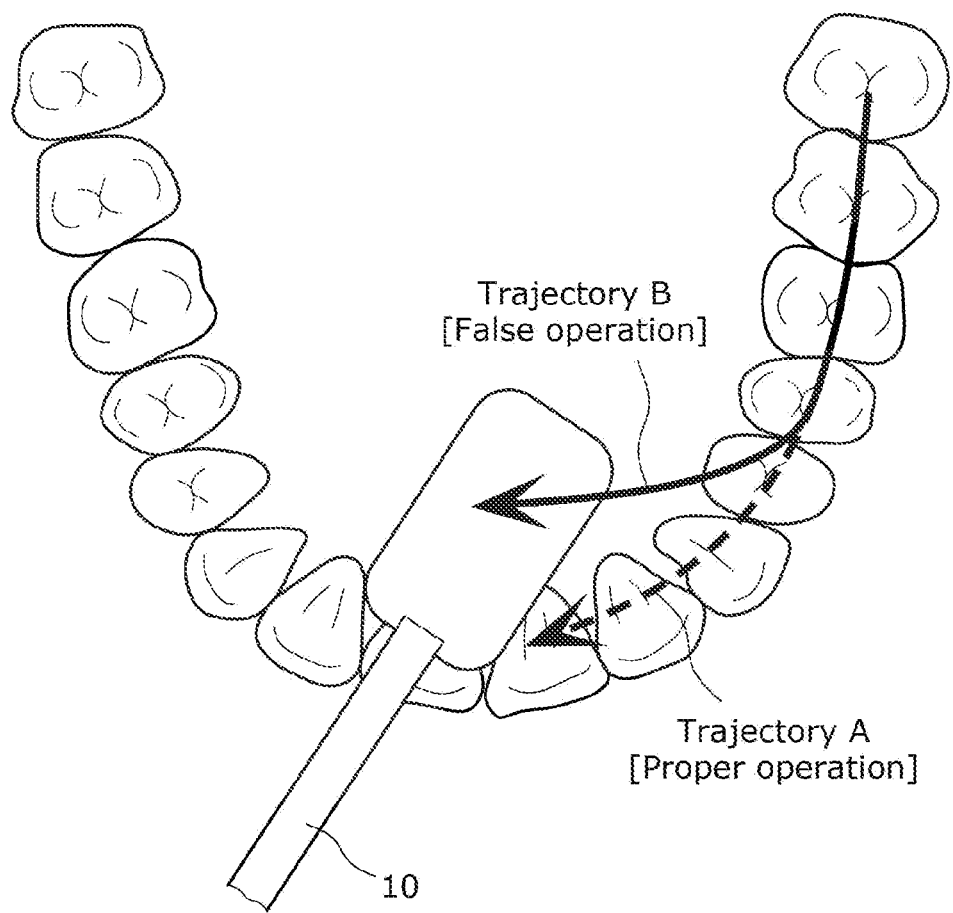
FIG. 1 illustrates a situation where a user is capturing images of the tops of their mandibular teeth by using an intraoral camera.
Figure 2:
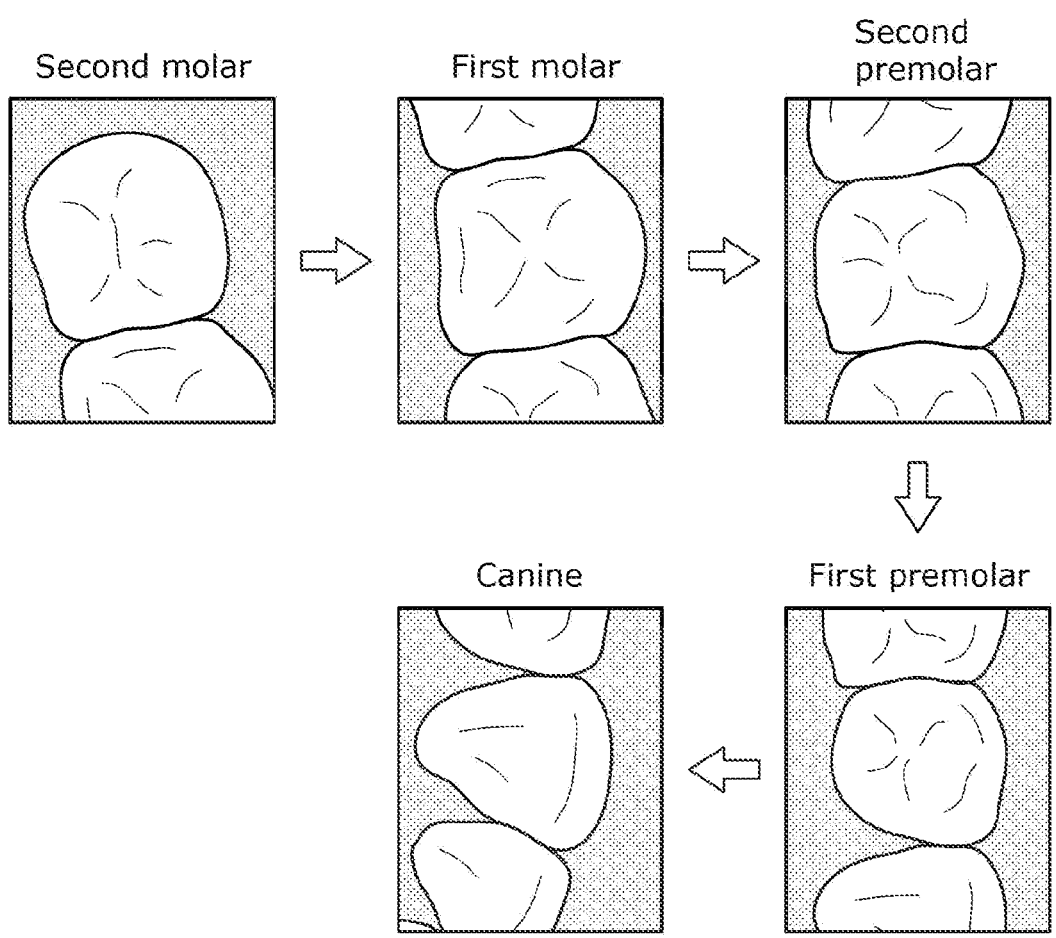
FIG. 2 illustrates examples of tooth images of the tops of the teeth captured along the dentition by the user.

FIG. 1 schematically illustrates image capturing using an intraoral camera. Trajectory A indicated by the dashed line illustrated in FIG. 1 illustrates the user capturing images of the tops of the mandibular right teeth by intraoral camera 10. The image capturing is being performed in the order of the second molar, the first molar, the second premolar, the first premolar, the canine, the lateral incisor, and the central incisor. FIG. 2 illustrates the results of the image capturing along the dentition performed by the user, the results showing the images of the tops of the first molar, the second premolar, the first premolar, and the canine. In the images illustrated in FIG. 2, the entirety of each tooth is inside an effective imaging area. Thus, the images are suitable for identification of the type and position of a tooth and generation of a panoramic image.

Figure 3:
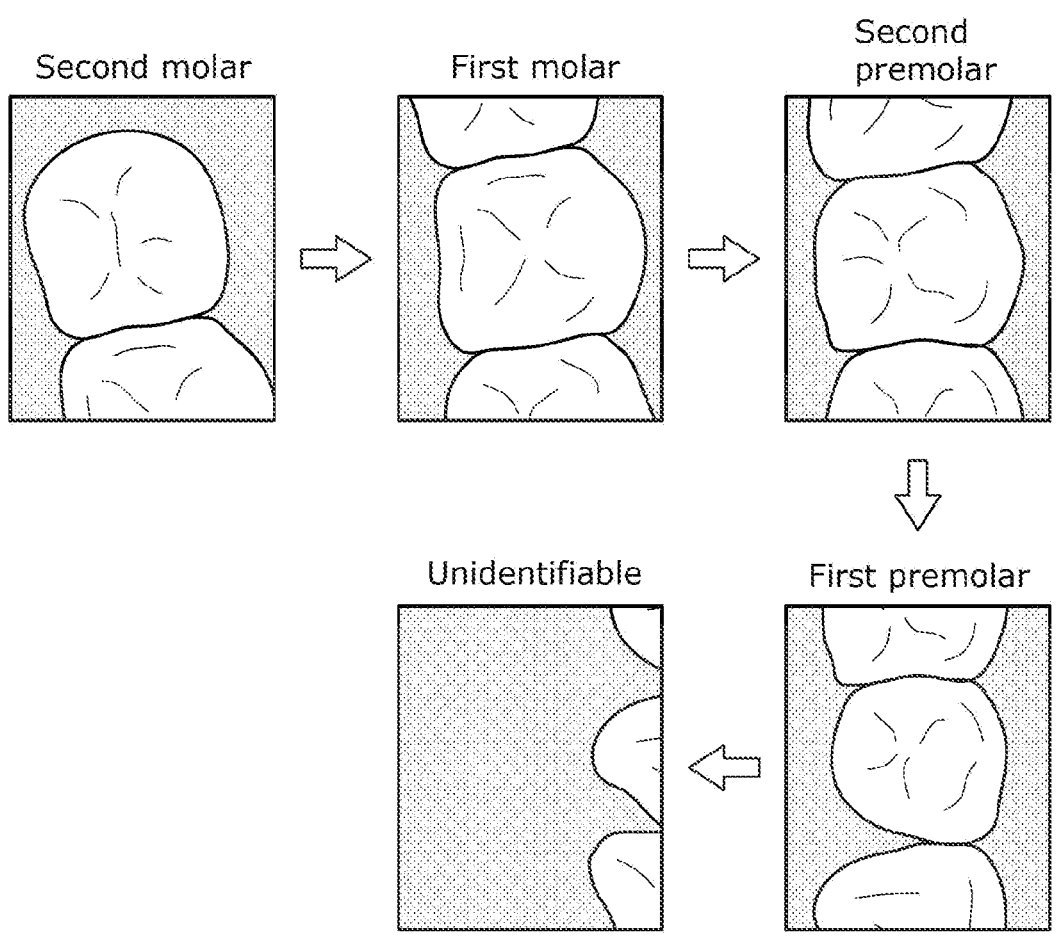
FIG. 3 illustrates examples of tooth images showing that the intraoral camera deviates from the dentition while the user is capturing images of the tops of the teeth along the dentition.

Meanwhile, trajectory B indicated by the solid line illustrated in FIG. 1 illustrates a situation in which intraoral camera 10 has deviated linguad because for example intraoral camera 10 was pushed by the cheek after capturing an image of the first premolar. FIG. 3 illustrates the results of the image capturing in this case. In the example illustrated in FIG. 3, the images of the first molar, the second premolar, and the first premolar are suitable for identification of the type and position of a tooth and generation of a panoramic image. However, since a portion of the canine is outside the effective imaging area, the image showing the canine is not suitable for identification of the type and position of a tooth and generation of a panoramic image.

In addition, the user performs image capturing by themselves while manually operating intraoral camera 10. Thus, for instance, after capturing an image of the second premolar, the user may capture an image of the canine without capturing an image of the first premolar due to, for example, a camera shake. If such a failure occurs during the image capturing, the user has to perform the image capturing again, which decreases user experience.

In view of this, the inventors of the present disclosure devised the intraoral camera system described below, through diligent research on an intraoral camera system capable of readily identifying the type and position of a tooth or readily generating a panoramic dentition image, according to tooth image data captured by the imaging unit of an intraoral camera.

An intraoral camera system according to one aspect of the present disclosure includes an imaging unit that generates an image data item showing a target tooth for image capturing inside a mouth, a position coordinate extractor that defines two-dimensional plane coordinates for the image data item generated by the imaging unit and extracts the position coordinates of the outline of the target tooth from the entire imaging area of the imaging unit, and an image determination unit that determines, when part of the outline of the target tooth is outside an effective area set inside the entire imaging area of the imaging unit, that the target tooth extends beyond the effective area.

Thus, the intraoral camera system can determine whether the tooth extends beyond the effective area. Accordingly, for instance, it is possible to notify the user that the tooth extends beyond the effective area and suggest, for example, performing the image capturing again, which can improve the accuracy of the image capturing. Since the user can readily perform proper image capturing, the user experience improves. Since the intraoral camera system can properly determine whether the tooth extends beyond the effective area, it is possible to improve the accuracy of the image capturing.

For instance, the imaging unit is capable of capturing a series of frames, and the intraoral camera system may include a notifier that monitors the results of determination by the image determination unit during the period from when part of the outline of the target tooth enters the entire imaging area until when the part of the outline goes beyond the entire imaging area, and notifies a user of a failure of the image capturing when the image determination unit determines, for each of image data items corresponding to the series of frames, that the target tooth extends beyond the effective area.

Thus, when the tooth extends beyond the effective area, the intraoral camera system can notify the user of the failure of the image capturing and suggest, for example, performing the image capturing again. Accordingly, the accuracy of the image capturing improves.

For instance, when the image determination unit determines, for each of the image data items corresponding to the series of frames, that the target tooth extends beyond the effective area, the notifier may notify the user of at least one of the type and the position of the target tooth.

Since the user can be aware of the tooth extending beyond the effective area, the user can readily perform the image capturing again, for example.

For instance, the notifier may notify, by vibration, the user of the failure of the image capturing.

For instance, when the image determination unit determines, for each of the image data items corresponding to the series of frames, that the target tooth extends beyond the effective area, the notifier may further notify the user of an instruction to perform the image capturing again.

For instance, the intraoral camera system may further include an identifier that identifies, on the basis of the image data items corresponding to the series of frames, at least one of the type and the position of the target tooth when the image determination unit determines that the target tooth is not beyond the effective area in the series of frames.

For instance, the identifier may identify, on the basis of image data items captured by the imaging unit, the type and the position of each of teeth shown in the image data items, and the intraoral camera system may further include a first determination unit that determines whether a first imaging order of the teeth is identical to a predetermined second imaging order, the first imaging order being based on the type and the position identified of each of the teeth shown in the image data items.

Thus, the intraoral camera system can determine that the first imaging order of the teeth being performed differs from the predetermined second imaging order. Accordingly, for instance, it is possible to notify the user that the imaging order is incorrect and suggest, for example, performing image capturing again, which can improve the accuracy of the image capturing. Since the user can readily perform proper image capturing, the user experience improves.

For instance, when the first determination unit determines that the first imaging order is not identical to the second imaging order, the notifier may further notify the user that the imaging order is incorrect.

For instance, the notifier may notify, by vibration, the user that the imaging order is incorrect.

For instance, when the first determination unit determines that the first imaging order is not identical to the second imaging order, the notifier may further notify the user of an instruction to perform image capturing again.

For instance, the intraoral camera system may further include a second determination unit that determines whether a first imaging direction of each of the teeth shown in the image data items is identical to a predetermined second imaging direction.

For instance, the identifier may identify the type and the position of the tooth, by using an estimation model that includes a neural network and outputs the type and the position of the tooth when the image data item is input to the estimation model.

For instance, the identifier may detect an interdental position from the image data item, generate tooth images each showing a tooth, according to the interdental position detected, and identify the types and positions of teeth shown in the tooth images, according to the tooth images.

For instance, the intraoral camera system may further include a user information obtainer that obtains user information indicating at least one of the gender, age group, and race of the user, and the identifier may identify the type and the position of the tooth according to the user information and the image data item.

Since the intraoral camera system can perform proper identification according to, for example, the user information, the accuracy of identification improves.

In addition, an image capturing operation determination method according to another aspect of the present disclosure includes defining two-dimensional plane coordinates for an image data item generated by an imaging unit capturing an image of a target tooth for image capturing inside a mouth and extracting, from the entire imaging area of the imaging unit, the position coordinates of the outline of the target tooth and determining, when part of the outline of the target tooth is outside an effective area set inside the entire imaging area of the imaging unit, that the target tooth extends beyond the effective area.

Thus, by the image capturing operation determination method, it is possible to determine whether the tooth extends beyond the effective area. Accordingly, for instance, it is possible to notify the user that the tooth extends beyond the effective area and suggest, for example, performing the image capturing again, which can improve the accuracy of the image capturing. Since the user can readily perform proper image capturing, the user experience improves. Since the intraoral camera system can properly determine whether the tooth extends beyond the effective area, it is possible to improve the accuracy of image capturing.

It should be noted that these general or specific aspects may be embodied as a system, a method, an integrated circuit, a computer program, or a computer-readable recording medium, such as a CD-ROM, or may be embodied by any combination of the system, the method, the integrated circuit, the computer program, and the recording medium.

An embodiment is described below in detail with reference to the drawings as necessary. However, excessively detailed explanations may be omitted. For instance, detailed explanations for well-known matters and overlapping explanations for substantially the same structural elements may be omitted. Such an omission is made to avoid unnecessary redundancy of the descriptions below and to facilitate understanding by those skilled in the art.

It should be noted that the inventors of the present disclosure provide the appended drawings and the following descriptions for thorough understanding of the present disclosure by those skilled in the art. There is no intention to limit the present disclosure by the appended drawings and the following descriptions.

Embodiment

Figure 4:
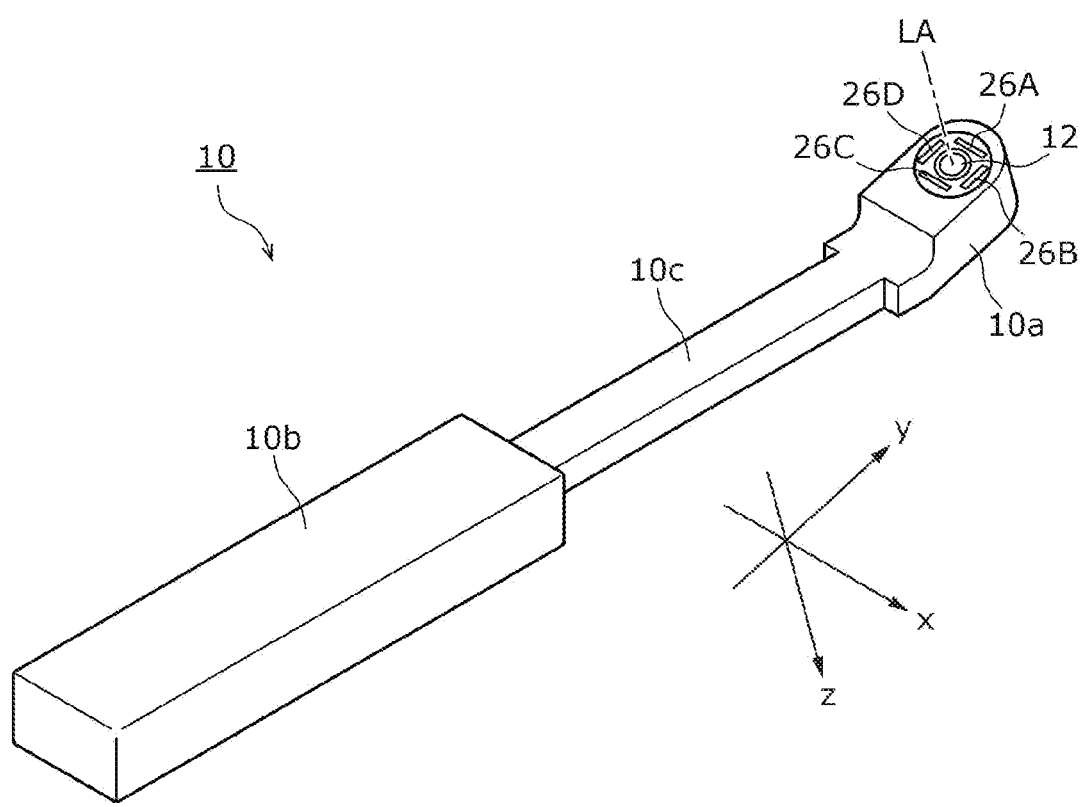
FIG. 4 is a perspective view of the intraoral camera of an intraoral camera system according to an embodiment.

FIG. 4 is a perspective view of the intraoral camera of an intraoral camera system according to the embodiment. As illustrated in FIG. 4, intraoral camera 10 includes a toothbrush-shaped case that can be handled by one hand. The case includes head 10a, handle 10b, and neck 10c. Head 10a is put inside a user's mouth when a dentition image is captured. Handle 10b is designed to be held by a user. Neck 10c connects head 10a to handle 10b.

Imaging optical system 12 is incorporated into head 10a and neck 10c. Imaging optical system 12 includes image sensor 14 and a lens (not illustrated in FIG. 4) disposed on optical axis LA.

Image sensor 14 is an image device, such as a C-MOS sensor or a CCD sensor, and the lens forms an image of a tooth. Image sensor 14 outputs a signal (image data) corresponding to the formed image to an external device.

In addition, intraoral camera 10 is equipped with first to fourth LEDs 26A to 26D as lighting devices that illuminate a target tooth during image capturing. First to fourth LEDs 26A to 26D are, for example, white LEDs.

Figure 5:
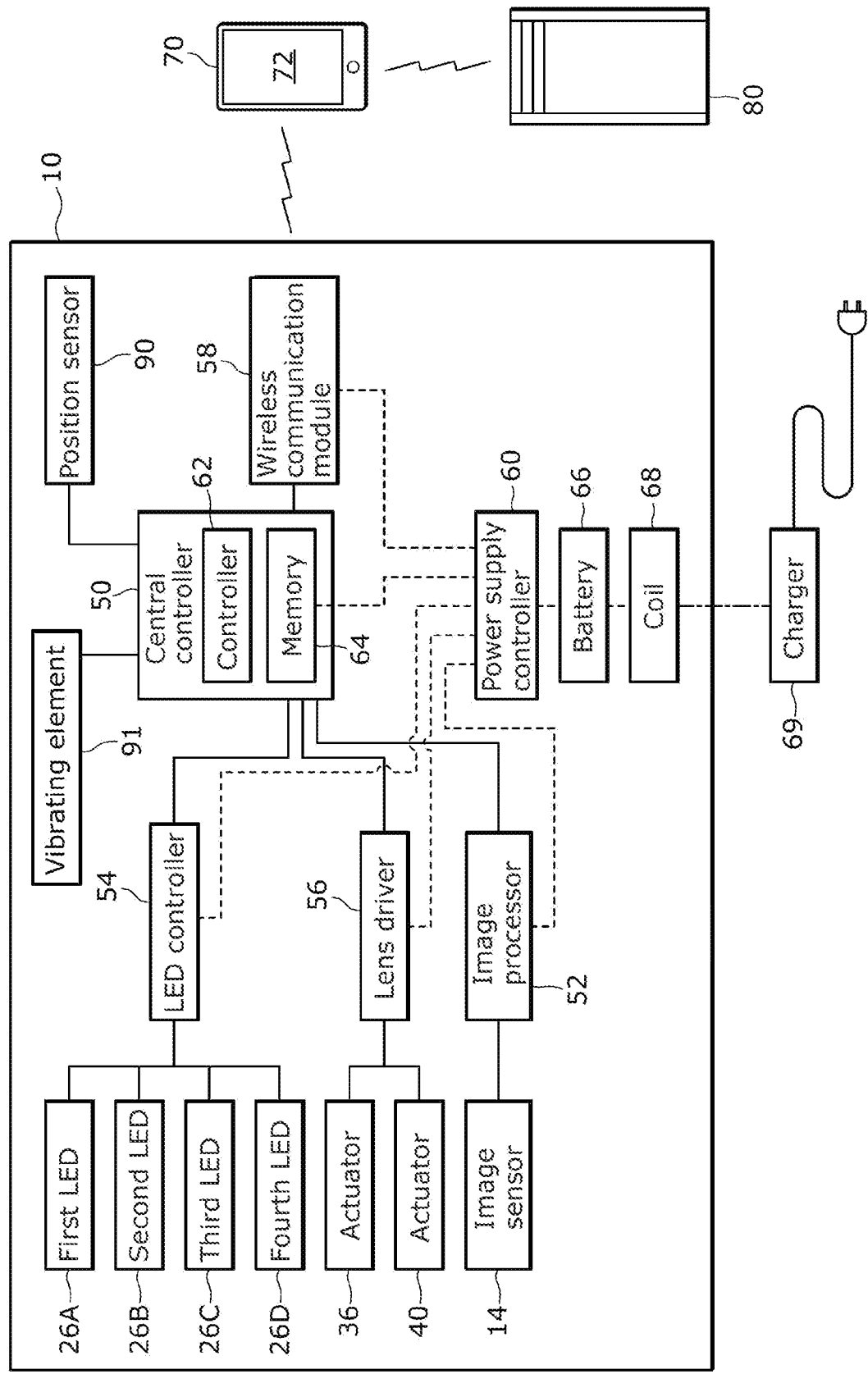
FIG. 5 illustrates a schematic configuration of the intraoral camera system according to the embodiment.

FIG. 5 is a schematic configuration of the intraoral camera system according to the embodiment. As illustrated in FIG. 5, in the overview of operation, the intraoral camera system according to the embodiment captures a dentition image by using intraoral camera 10 and performs image processing for the captured image.

As illustrated in FIG. 5, the intraoral camera system includes intraoral camera 10, portable terminal 70, and cloud server 80.

Portable terminal 70 is, for example, a wirelessly communicable smartphone or a tablet terminal. Portable terminal 70 includes, as an input device and an output device, touch screen 72 capable of displaying, for example, a dentition image. Portable terminal 70 functions as a user interface of the intraoral camera system.

Cloud server 80 can communicate with portable terminal 70 via, for example, the Internet and provides portable terminal 70 with an application to use intraoral camera 10. For instance, the user downloads the application from cloud server 80 and installs the application on portable terminal 70. In addition, cloud server 80 obtains a dentition image captured by intraoral camera 10 via portable terminal 70.

The intraoral camera system includes, as main elements that controls the system, central controller 50, image processor 52, LED controller 54, lens driver 56, and position sensor 90, and vibrating sensor 91. Image processor 52 performs image processing for a dentition image captured by image sensor 14. LED controller 54 controls LEDs 26A to 26D. Lens driver 56 controls actuator 36 that is a composition adjustment mechanism and actuator 40 that is a focus adjustment mechanism.

In addition, the intraoral camera system includes wireless communication module 58 that wirelessly communicates with portable terminal 70 and power supply controller 60 that supplies power to, for example, central controller 50.

Central controller 50 of the intraoral camera system is incorporated into, for example, handle 10b of intraoral camera 10. For instance, central controller 50 includes controller 62, such as a CPU or an MPU, that performs various processing tasks described later and memory 64, such as RAM or ROM, storing programs used to cause controller 62 to perform the various processing tasks. It should be noted that in addition to the programs, dentition images captured by image sensor 14 (image data) and various setting data items are stored in memory 64.

Image processor 52 is incorporated into, for example, handle 10b of intraoral camera 10. On the basis of a control signal from controller 62 of central controller 50, image processor 52 obtains a dentition image captured by image sensor 14 (image data), performs the image processing for the obtained dentition image, and outputs, to central controller 50, the dentition image that has undergone the image processing. Image processor 52 is, for example, a circuit and performs, for the dentition image, the image processing such as noise removal and automatic white balance (AWB) adjustment. Controller 62 transmits the dentition image output by image processor 52 to portable terminal 70 via wireless communication module 58. Portable terminal 70 displays the transmitted dentition image on touch screen 72. In this way, touch screen 72 displays the dentition image to the user.

LED controller 54 is incorporated into, for example, handle 10b of intraoral camera 10 and turns on and off first to fourth LEDs 26A to 26D on the basis of a control signal from controller 62. LED controller 54 is, for example, a circuit. When for instance the user performs an operation to start intraoral camera 10 for touch screen 72 of portable terminal 70, portable terminal 70 transmits a signal corresponding to the operation to controller 62 via wireless communication module 58. On the basis of the received signal, controller 62 transmits the control signal to LED controller 54 to turn on first to fourth LEDs 26A to 26D.

Lens driver 56 is incorporated into, for example, handle 10b of intraoral camera 10 and controls actuator 36, which is the composition adjustment mechanism, and actuator 40, which is the focus adjustment mechanism, on the basis of control signals from controller 62 of central controller 50. Lens driver 56 is, for example, a circuit. When for instance the user performs operations regarding composition adjustment and focus adjustment for touch screen 72 of portable terminal 70, portable terminal 70 transmits signals corresponding to the operations to central controller 50 via wireless communication module 58. On the basis of the received signals, controller 62 of central controller 50 transmits the control signals to lens driver 56 to perform composition adjustment and focus adjustment. In addition, for instance, on the basis of the dentition image received from image processor 52, controller 62 calculates the amount of control for actuator 36 necessary to perform composition adjustment and the amount of control for actuator 40 necessary to perform focus adjustment. Then, control signals corresponding to the calculated amounts of control are transmitted to lens driver 56.

Wireless communication module 58 is incorporated into, for example, handle 10b of intraoral camera 10 and wirelessly communicates with portable terminal 70 on the basis of a control signal from controller 62. Wireless communication module 58 performs, with portable terminal 70, wireless communication that complies with an existing communication standard, such as Wi-Fi (registered trademark) or Bluetooth (registered trademark). Intraoral camera 10 transmits a dentition image showing tooth D to portable terminal 70 via wireless communication module 58, and portable terminal 70 transmits an operation signal to intraoral camera 10 via wireless communication module 58.

In the embodiment, power supply controller 60 is incorporated into handle 10b of intraoral camera 10 and distributes the power of battery 66 to central controller 50, image processor 52, LED controller 54, lens driver 56, and wireless communication module 58. Power supply controller 60 is, for example, a circuit. It should be noted that in the embodiment, battery 66 is a rechargeable battery (secondary battery), and external charger 69 connected to a commercial power supply wirelessly recharges battery 66 via coil 68 included in intraoral camera 10.

Position sensor 90 is used to detect the orientation and position of intraoral camera 10 and is, for example, a multi-axis (here, x, y, and z-axis, that is, three-axis) acceleration sensor. For instance, position sensor 90 may be a six-axis sensor including a three-axis acceleration sensor and a three-axis gyro sensor. For instance, as illustrated in FIG. 4, the z-axis is identical to optical axis LA. The y-axis is parallel to an imaging plane and extends in a longitudinal direction of intraoral camera 10. In addition, the x-axis is parallel to the imaging plane and orthogonal to the y-axis. Output (sensor data) for each axis of position sensor 90 is transmitted to portable terminal 70 via central controller 50 and wireless communication module 58.

A piezo-resistive type, capacitive type, or heat detection type MEMS sensor may be used as position sensor 90. Although not illustrated in the figure, it is preferable to provide a correction circuit for correcting, for example, the balance of sensor sensitivity between the axes, the temperature characteristics of sensitivity, and temperature drift. In addition, a bandpass filter (low pass filter) for removing dynamic acceleration components and a noise may be provided. A noise can be reduced also by smoothing a waveform output by the acceleration sensor.

Vibrating element 91 is, for example, mounted onto handle 10b of intraoral camera 10 and vibrates handle 10b.

Figure 6:
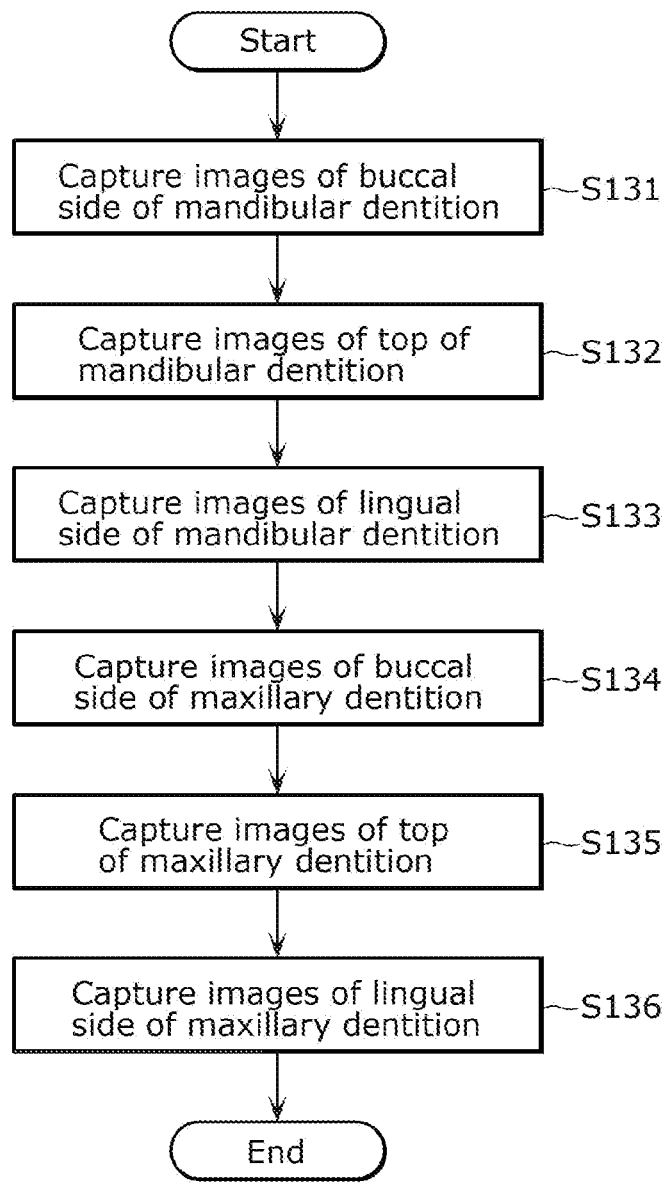
FIG. 6 is a flowchart illustrating a whole procedure of intraoral-image capturing operations according to the embodiment.

Intraoral-image capturing operation of the intraoral camera system is described below. FIG. 6 is a flowchart illustrating a whole procedure of intraoral-image capturing operations performed by the user. As illustrated in FIG. 6, for example, image capturing is performed in six steps. First, the user captures images of the buccal side of the mandibular dentition of the user, by using intraoral camera 10 (S131).

Figure 7:
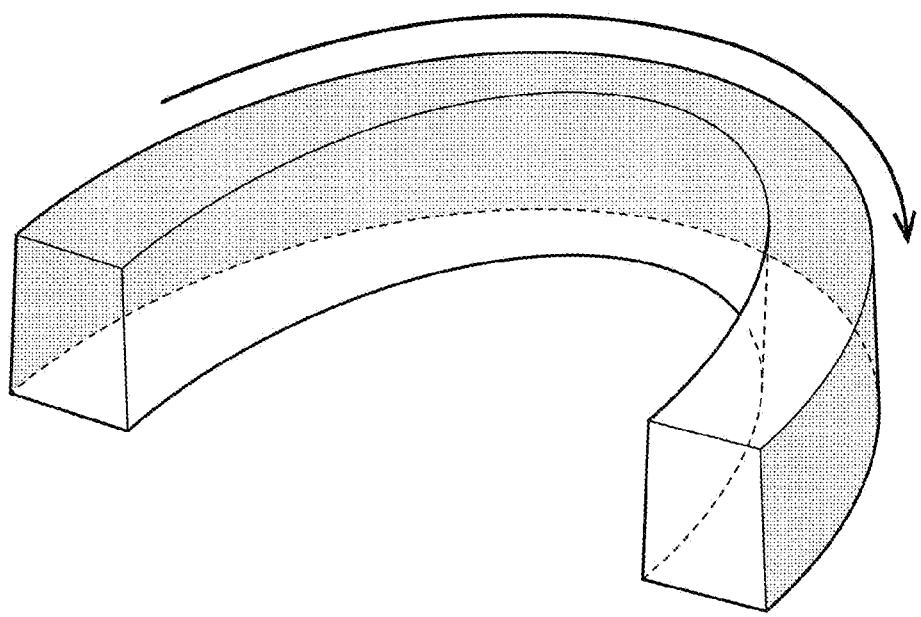
FIG. 7 schematically illustrates an image capturing procedure according to the embodiment.

FIG. 7 schematically illustrates an image capturing procedure in the operation. The U-shape illustrated in FIG. 7 schematically illustrates the mandibular dentition, and image capturing is performed on the dentition along the buccal side (outer surface) illustrated by the hatched area. In addition, for instance, image capturing is performed sequentially from the left molar toward the right molar according to the imaging order indicated by the arrow.

Figure 8:
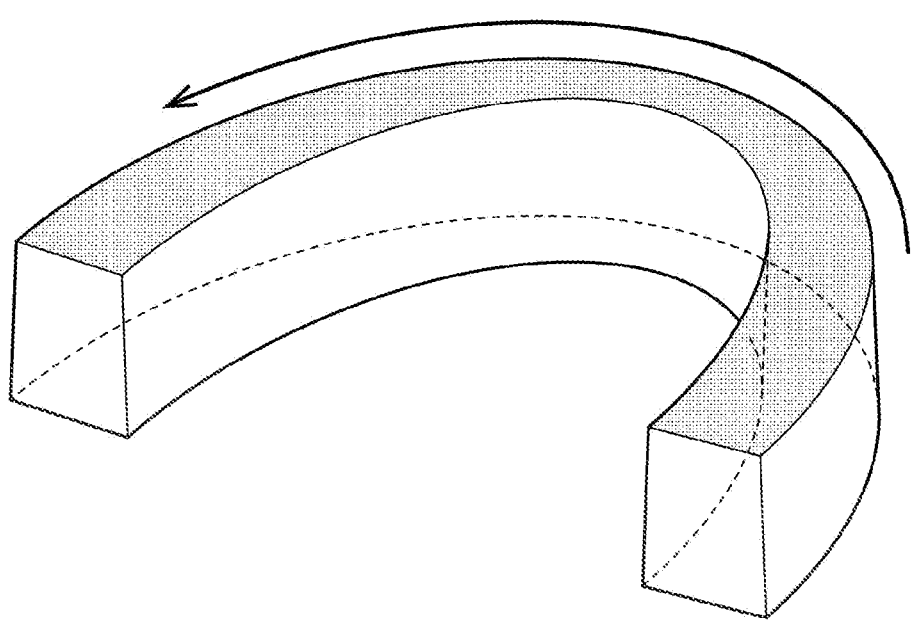
FIG. 8 schematically illustrates an image capturing procedure according to the embodiment.

Next, the user captures images of the top of the mandibular dentition of the user, by using intraoral camera 10 (S132). FIG. 8 schematically illustrates an image capturing procedure in the operation. As illustrated in FIG. 8, image capturing is performed on the dentition along the top (top surface) illustrated by the hatched area. In addition, for instance, image capturing is performed sequentially from the right molar toward the left molar according to the imaging order indicated by the arrow.

Figure 9:
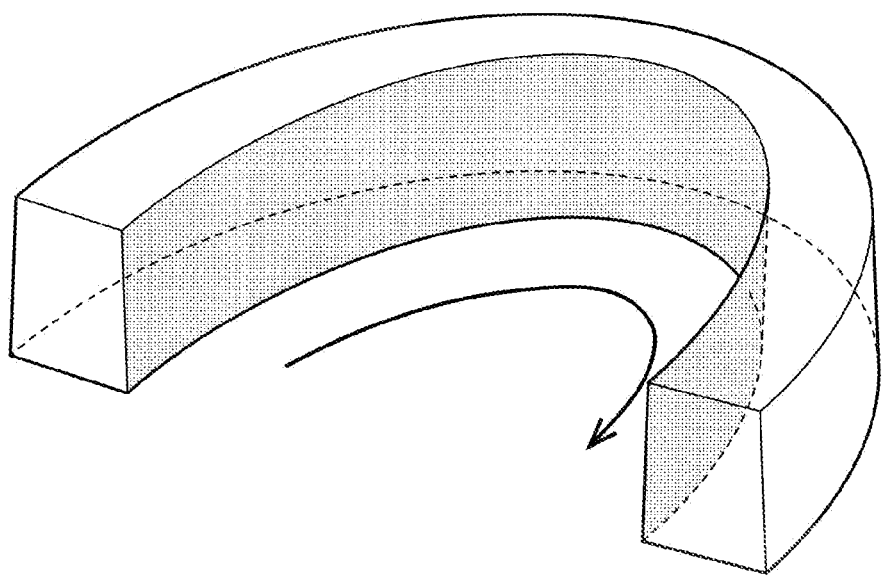
FIG. 9 schematically illustrates an image capturing procedure according to the embodiment.

Then, the user captures images of the lingual side of the mandibular dentition of the user, by using intraoral camera 10 (S133). FIG. 9 schematically illustrates an image capturing procedure in the operation. As illustrated in FIG. 9, image capturing is performed on the dentition along the lingual side (inner surface) illustrated by the hatched area. In addition, for instance, image capturing is performed sequentially from the left molar toward the right molar according to the imaging order indicated by the arrow.

Then, similar image capturing is performed on the maxillary dentition. Specifically, the user captures images of the buccal side of the maxillary dentition of the user, by using intraoral camera 10 (S134). Then, the user captures images of the top of the maxillary dentition of the user, by using intraoral camera 10 (S135). Finally, the user captures images of the lingual side of the maxillary dentition of the user, by using intraoral camera 10 (S136).

Thus, image data items showing the buccal side, the top, and the lingual side of the mandibular dentition and image data items showing the buccal side, the top, and the lingual side of the maxillary dentition are obtained. It should be noted that the order of the steps (S131 to S136) illustrated herein is just an example, and the order of the steps may be any order. In addition, the imaging order illustrated in FIGS. 7 to 9 is an example, and the order may be any order. For instance, the same imaging order may be used in all the steps, and a part of the imaging order may be different among the steps.

In addition, when for instance the user performs image capturing, the image capturing position (e.g., mandible or maxilla), the imaging direction (e.g., the buccal side, the top, or the lingual side), and the imaging order (e.g., from the left molar toward the right molar or from the right molar toward the left molar) may be presented to the user as step information. When for instance image capturing is performed on the buccal side of the mandibular dentition (S131), an image as illustrated in FIG. 7 may be displayed on portable terminal 70, and the user may also be notified of an instruction to perform image capturing on the buccal side of the mandibular dentition along the arrow. In addition, notification of the instruction may be performed by displaying, for example, text on portable terminal 70 or by sound. Both of the methods may be used together.

Figure 10:
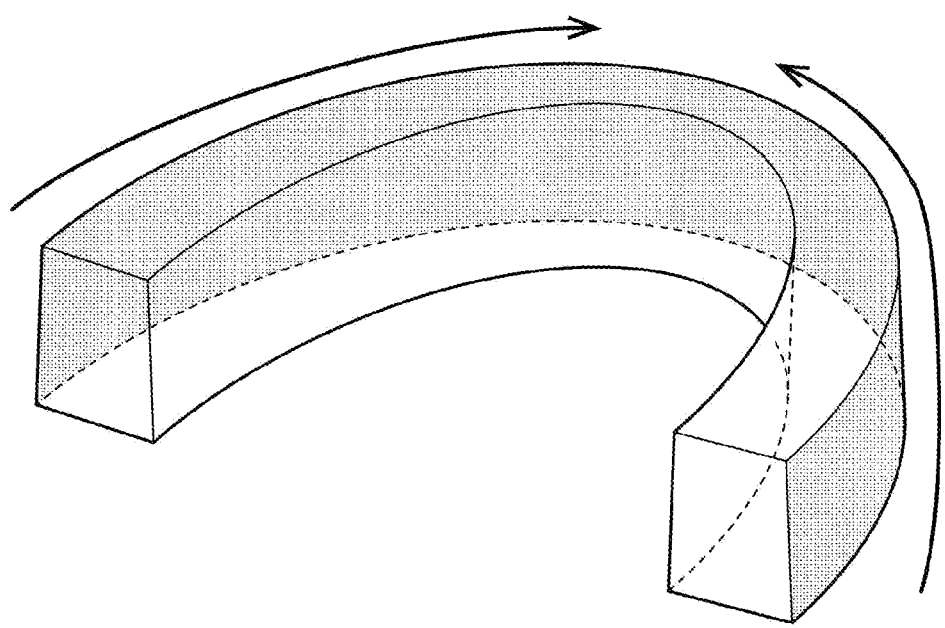
FIG. 10 schematically illustrates an image capturing procedure according to the embodiment.
Figure 11:
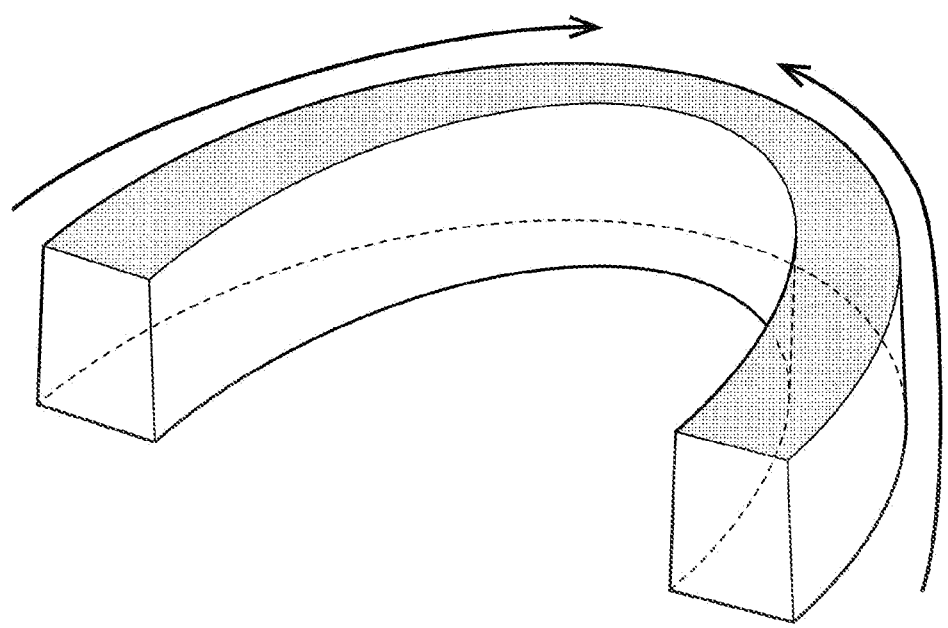
FIG. 11 schematically illustrates an image capturing procedure according to the embodiment.
Figure 12:
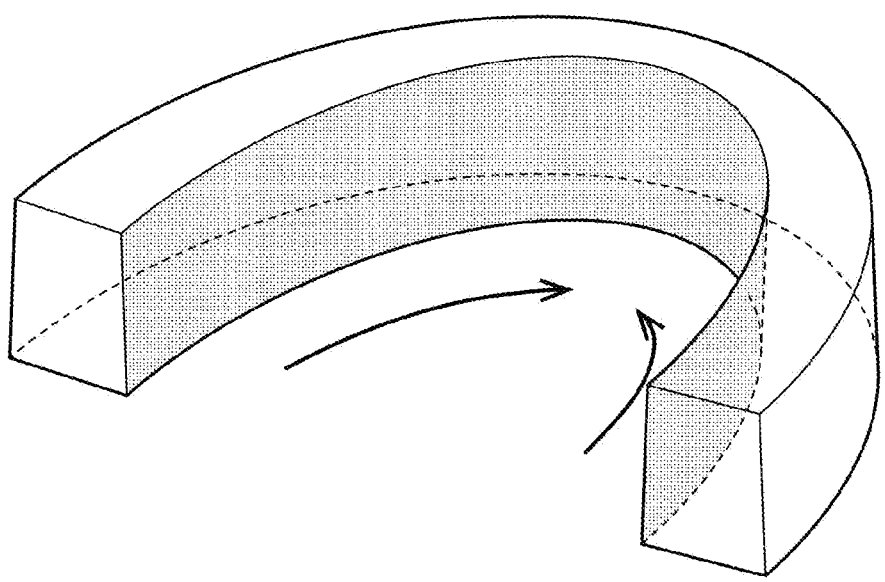
FIG. 12 schematically illustrates an image capturing procedure according to the embodiment.

In the above example, the six steps are performed. However, the number of the steps may be any number. For instance, the above steps may be divided into more steps. FIGS. 10 to 12 schematically illustrate variations of an image capturing procedure. For instance, as illustrated in FIG. 10, the image capturing on the buccal side of the mandibular dentition (S131) may be divided into the step of image capturing on the buccal side of the right area of the mandibular dentition and the step of image capturing on buccal side of the left area of the mandibular dentition. Likewise, for instance, as illustrated in FIG. 11, the image capturing on the top of the mandibular dentition (S132) may be divided into the step of image capturing on the top of the right area of the mandibular dentition and the step of image capturing on the top of the left area of the mandibular dentition. Likewise, as illustrated in FIG. 12, the image capturing on the lingual side of the mandibular dentition (S133) may be divided into the step of image capturing on the lingual side of the right area of the mandibular dentition and the step of image capturing on the lingual side of the left area of the mandibular dentition. In addition, a part of the above six steps does not have to be performed.

Figure 13:
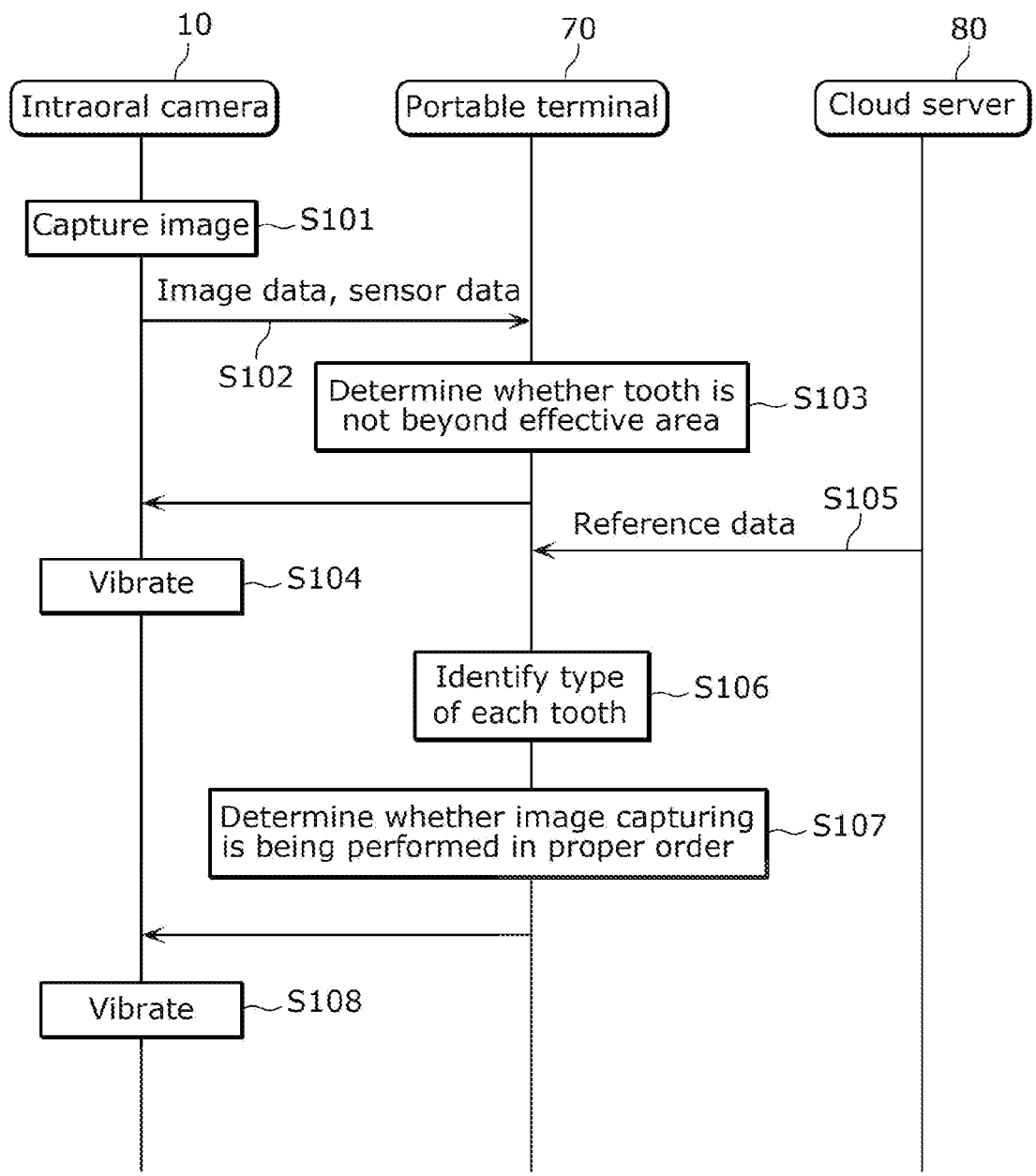
FIG. 13 illustrates a procedure of intraoral-image capturing operation by the intraoral camera system according to the embodiment.

The procedure of processing for image data is described. FIG. 13 illustrates a procedure of intraoral-image capturing operation by the intraoral camera system. It should be noted that the processing illustrated in FIG. 13 is, for example, processing performed in real time, and the processing is performed every time image data of one frame or two or more frames is obtained.

When the user captures an image of a tooth and gums inside their mouth by using intraoral camera 10, image data is generated (S101). Then, intraoral camera 10 transmits, to portable terminal 70, the captured image data and sensor data obtained by position sensor 90 during the image capturing (S102). It should be noted that the image data may be a video or one or more still images. In addition, if the image data is a video or includes two or more still images, the sensor data is transmitted for each video frame or for each still image. It should be noted that if the image data is a video, the sensor data may be transmitted every two or more frames.

In addition, the image data and the sensor data may be transmitted in real time or together after a series of image capturing (for example, images of all the teeth inside the user's mouth are captured).

Then, portable terminal 70 determines whether each of teeth included in captured image data items is not beyond the effective area (S103).

When portable terminal 70 determines, for at least one of the captured image data items, that the tooth extends beyond the effective area, the user is notified of the information. For instance, when vibrating element 91 of intraoral camera 10 vibrates, the user is notified that image capturing is being performed in a state in which the tooth extends beyond the effective area (S104).

When determining, for the captured image data items, that the tooth is not beyond the effective area of intraoral camera 10, portable terminal 70 obtains reference data from cloud server 80 (S105) and identifies the types and positions of the teeth included in the image data items, by using the received image data items and sensor data and the obtained reference data (S106).

Figure 14:
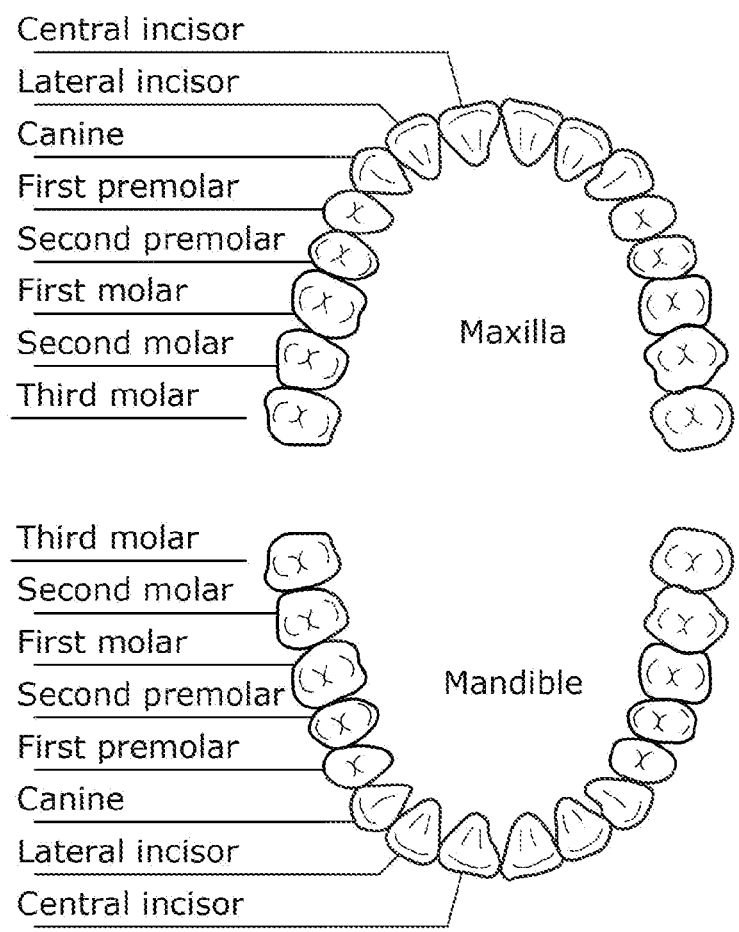
FIG. 14 illustrates teeth inside a mouth according to the embodiment.

FIG. 14 illustrates teeth inside a mouth. The types of teeth identified by portable terminal 70 are, for example, the central incisors, the lateral incisors, and the canines illustrated in FIG. 14. The positions of teeth identified by portable terminal 70 correspond to, for example, the maxilla, the mandible, the right side, and the left side. That is, to identify the type and position of a tooth is to identify the target tooth from the teeth illustrated in FIG. 14.

Then, portable terminal 70 determines whether the image capturing is being performed in the proper order (whether proper scanning is being performed), by using the identified types and positions of the teeth (S107). Specifically, portable terminal 70 determines whether the image capturing is being performed in the proper order, by determining whether the imaging order of the teeth based on the identified types and positions of the teeth is identical to a predetermined imaging order.

If the image capturing is not being performed in the proper order, the user is notified of the information. For instance, when vibrating element 91 of intraoral camera 10 vibrates, the user is notified that the image capturing is not being performed in the proper order (S108).

In addition, portable terminal 70, for example, may create a three-dimensional model of the teeth inside the mouth from the captured image data items, by using the identified types and positions of the teeth and display an image based on the created three-dimensional model.

In addition, portable terminal 70 may create a panoramic image by combining the captured image data items. In this case, it is preferable that each image data item should include an image of a boundary with at least one of teeth on both sides of the tooth of interest. For instance, it is preferable that the image data item should include an image of an adjacent tooth showing at least around 10% of the tooth size of the adjacent tooth (e.g., the size of the entire tooth including the sizes of the projections and depressions of the occlusal surface) or an arrangement size (e.g., the distance between adjacent teeth).

By using such an intraoral camera system, the user can capture, by intraoral camera 10, an intraoral image showing the interior of their mouth and check their intraoral condition displayed on portable terminal 70. Thus, the user can readily check the health condition of their teeth, for instance.

It should be noted that in the example below, portable terminal 70 identifies, for example, the types of teeth and determines whether the image capturing is being performed in the proper order. However, a part or all of the processing performed by portable terminal 70 may be performed by intraoral camera 10 or cloud server 80.

Figure 15:
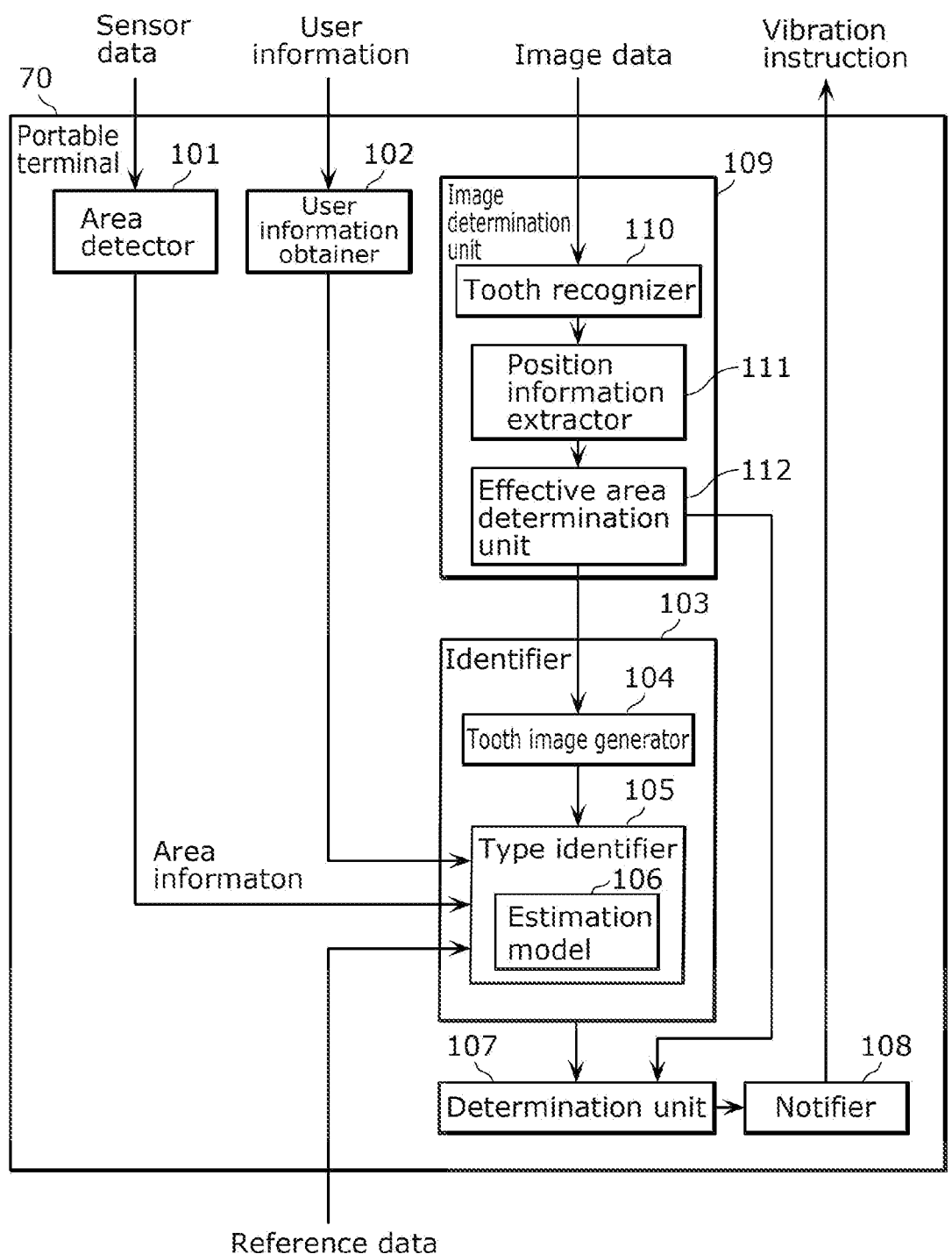
FIG. 15 is a functional block diagram of a portable terminal according to the embodiment.

FIG. 15 is a functional block diagram of portable terminal 70. Portable terminal 70 includes area detector 101, user information obtainer 102, identifier 103, determination unit 107, and notifier 108. The functions of these processing units are achieved, for example, by a program executer, such as a CPU or a processor, reading and executing a software program stored in a recording medium, such as a hard disk or semiconductor memory.

Area detector 101 detects intraoral areas corresponding to respective image data items by using the sensor data and generates area information items indicating the detected areas.

User information obtainer 102 obtains user information indicating a user attribute. For instance, user information obtainer 102 obtains user information input by the user via a user interface of portable terminal 70. Alternatively, user information obtainer 102 may obtain user information stored in portable terminal 70 or another device (e.g., cloud server 80). Specifically, the user information indicates at least one of the gender, age group (or age), and race of the user.

Image determination unit 109 determines whether a target tooth is inside the effective area by using an image data item, the target tooth being a target tooth for recognition included in the image data item. Image determination unit 109 includes tooth recognizer 110, position information extractor 111, and effective area determination unit 112. Tooth recognizer 110 extracts the target tooth by performing known image processing on an image signal output by image processor 52.

Tooth recognizer 110 identifies, by edge detection, the boundaries between the target tooth and the teeth on both sides of the target tooth and the boundary between the target tooth and the gingiva, for instance. In this way, tooth recognizer 110 can extract the target tooth and the teeth next to the target tooth. Alternatively, tooth recognizer 110 may extract the target tooth according to the feature pattern of the target tooth, by using the reference data.

Figure 16:
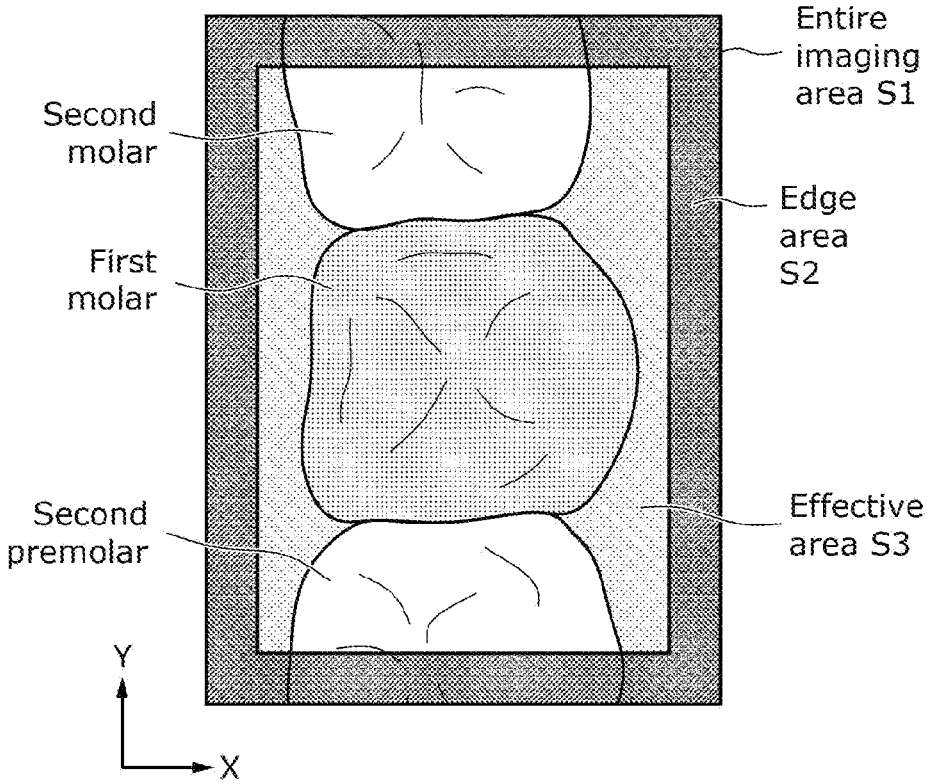
FIG. 16 illustrates an example of determination processing by an image determination unit according to the embodiment and a state in which a target tooth for recognition is inside an effective screen area.
Figure 17:
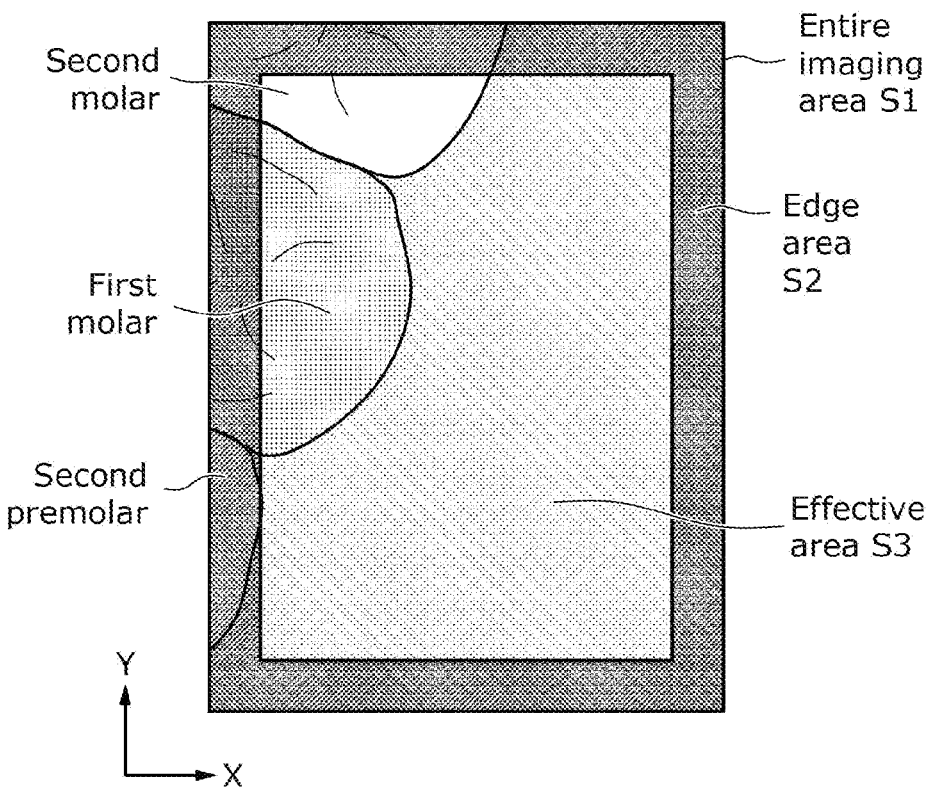
FIG. 17 illustrates an example of the determination processing by the image determination unit according to the embodiment and a state in which the target tooth for recognition extends beyond the effective screen area.

Position information extractor 111 performs known image processing on an image signal output by image processor 52 and extracts position information on the target tooth inside the effective area of image sensor 14 every predetermined time period. FIGS. 16 and 17 each illustrate an example of an image data item and effective area S3 of image sensor 14. As illustrated in FIGS. 16 and 17, effective area S3 (effective image area) corresponds to an imaging area. Effective area S3 is the area in which edge area S2, which is a circumferential area of entire imaging area 51, is removed from entire imaging area 51 made up of all the pixels of image sensor 14. By removing edge area S2, it is possible to avoid noise being added to the tooth image. It should be noted that edge area S2 does not necessarily have to be set, depending on the performance of image sensor 14, and the effective area may correspond to entire imaging area 51. In addition, the predetermined time period used when extracting tooth position information may optionally be changed via controller 62.

It should be noted that for instance, position coordinates (X, Y) where an optional point is the origin in two-dimensional plane image data are used as the position information. For instance, position information extractor 111 extracts a group of position coordinates {(Xa, Ya) to (Xz, Yz)} along the outline of the target tooth for recognition.

On the basis of position coordinates (X, Y) of the target tooth, effective area determination unit 112 determines whether the target tooth is inside effective area S3 set using entire imaging area 51 and edge area S2 illustrated in FIGS. 16 and 17.

As illustrated in FIG. 16, when the whole group of position coordinates {(Xa, Ya) to (Xz, Yz)} indicating the outline of the target tooth is inside effective area S3, determination unit 107 determines that the target tooth is inside effective area S3. Meanwhile, as illustrated in FIG. 17, when even a part of the group of position coordinates indicating the outline of the target tooth is not inside effective area S3 (is in edge area S2), determination unit 107 determines that the target tooth extends beyond effective area S3.

When determination unit 107 determines that the tooth included in the captured image data item extends beyond the effective area of intraoral camera 10, notifier 108 notifies the user that image capturing is being performed in a state in which the tooth extends beyond effective area S3, by, for example, vibrating vibrating element 91 of intraoral camera 10.

Identifier 103 identifies the types and positions of teeth included in image data items by using the image data items, area information, user information, and reference data. Identifier 103 includes tooth image generator 104 and type identifier 105. Tooth image generator 104 generates, from the image data items, tooth images each including a target tooth for recognition. It should be noted that a tooth image may include part of an adjacent tooth and may include the boundary with the adjacent tooth. Type identifier 105 identifies the types and positions of the teeth included in the tooth images by using the area information, the user information, the reference data, and estimation model 106.

Estimation model 106 is a model for estimating the type and position of a tooth included in a tooth image from the tooth image and the reference data. For instance, estimation model 106 may include a neural network.

By using the identified types and positions of the teeth, determination unit 107 determines whether the image capturing is being performed in the proper order. Specifically, determination unit 107 determines whether the image capturing is being performed in the proper order, by determining whether the imaging order of the teeth based on the identified types and positions of the teeth is identical to a predetermined imaging order.

When the image capturing is not being performed in the proper order, notifier 108 notifies the user of the information. For instance, notifier 108 transmits, to intraoral camera 10, a vibration instruction to vibrate vibrating element 91 of intraoral camera 10. Thus, vibrating element 91 of intraoral camera 10 vibrates, and the user is notified that the image capturing is not being performed in the proper order.

Figure 18:
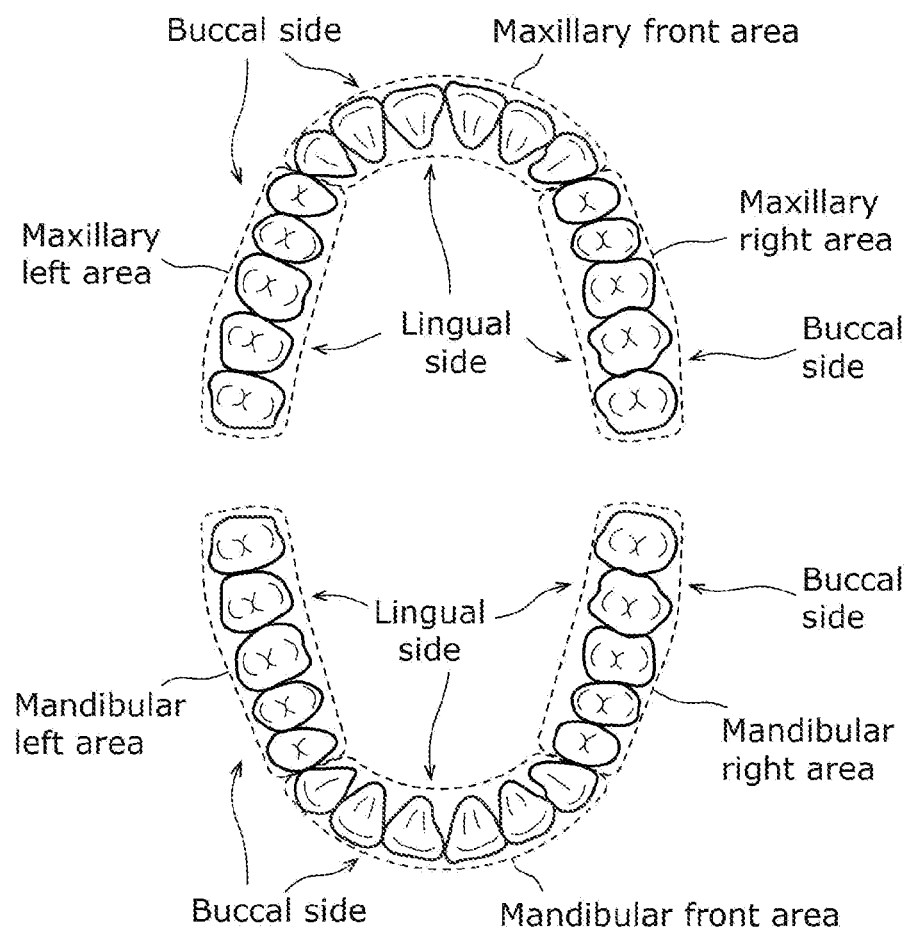
FIG. 18 illustrates an example of intraoral areas according to the embodiment.

An example of areas detected by area detector 101 is described below. FIG. 18 illustrates an example of intraoral areas. In FIG. 18, for instance, each tooth inside the mouth belongs to one of six areas: the maxillary left area, the maxillary front area, the maxillary right area, the mandibular left area, the mandibular front area, and the mandibular right area. It should be noted that the intraoral area is divided into six areas in the example. However, the number of areas may be any number. For instance, the intraoral area may be divided into two areas: a maxillary area and a mandibular area. In addition, each area may further be divided on the basis of imaging directions. For instance, as illustrated in FIG. 18, each area may be divided into a buccal-side area and a lingual-side area on the basis of two imaging directions. In the example, each tooth does not belong to more than one area. However, some of the teeth may belong to two or more areas. For instance, a tooth near the boundary of two adjacent areas may belong to both areas. For instance, in FIG. 18, the canine at the left end of the maxillary front area, which is the third tooth in the palmer notation method, may belong to both of the maxillary front area and the maxillary left area.

A specific example of a method of determining the area and the imaging direction from the sensor data is described below. Area detector 101 determines whether the area is maxillary or mandibular according to output Az by the acceleration sensor for the z-direction. Here, when a maxillary-dentition image is captured, an imaging plane faces upward to no small extent. When a mandibular-dentition image is captured, the imaging plane faces downward to no small extent. Thus, when Az>0, area detector 101 determines that the area corresponding to the image data is mandibular. When Az≤0, area detector 101 determines that the area corresponding to the image data is maxillary.

Then, a method of determining which area of the maxilla the area is, which is performed when it is determined that the area is maxillary, is described below. Area detector 101 determines whether the tooth is an anterior tooth, according to output Ay by the acceleration sensor for the y-direction. Here, when an image of an anterior tooth is captured, intraoral camera 10 is relatively horizontal. However, when an image of a molar is captured, intraoral camera 10 has to be tilted due to interference of lips. Thus, when Ay threshold a, area detector 101 determines that the area is the maxillary front area.

After determining that the area is the maxillary front area, area detector 101 further determines whether the area is the buccal-side area or the lingual-side area, according to output Ax by the acceleration sensor for the x-direction. Here, the orientation of the imaging plane when an image of the buccal side of a tooth is captured is opposite to the orientation of the imaging plane when an image of the lingual side of a tooth is captured. Thus, when Ax>0, area detector 101 determines that the area is the maxillary front buccal-side area. When Ax≤0, area detector 101 determines that the area is the maxillary front lingual-side area.

Meanwhile, when determining that the area is not the maxillary front area, area detector 101 determines the orientation of the imaging plane according to output Ax by the acceleration sensor for the x-direction. Specifically, when Ax>0, area detector 101 determines that the area is the maxillary right buccal-side area or the maxillary left lingual-side area. When Ax≤0, area detector 101 determines that the area is the maxillary left buccal-side area or the maxillary right lingual-side area.

Area detector 101 further narrows down the areas according to the area determined in the previous processing. Specifically, when area detector 101 determines whether the area is the maxillary right buccal-side area or the maxillary left lingual-side area, if the previously determined area is one of the maxillary front buccal-side area, the maxillary right buccal-side area, the maxillary right lingual-side area, the mandibular front buccal-side area, the mandibular right buccal-side area, and the mandibular right lingual-side area, area detector 101 estimates that the current area is the maxillary right buccal-side area. If the previously determined area is one of the maxillary front lingual-side area, the maxillary left buccal-side area, the maxillary left lingual-side area, the mandibular front lingual-side area, the mandibular left buccal-side area, and the mandibular left lingual-side area, area detector 101 estimates that the current area is the maxillary left lingual-side area.

When area detector 101 determines whether the area is the maxillary left buccal-side area or the maxillary right lingual-side area, if the previously determined area is one of the maxillary front buccal-side area, the maxillary left buccal-side area, the maxillary left lingual-side area, the mandibular front buccal-side area, the mandibular left buccal-side area, and the mandibular left lingual-side area, area detector 101 estimates that the current area is the maxillary left buccal-side area. If the previously determined area is one of the maxillary front lingual-side area, the maxillary right buccal-side area, the maxillary right lingual-side area, the mandibular front lingual-side area, the mandibular right buccal-side area, and the mandibular right lingual-side area, area detector 101 estimates that the current area is the maxillary right lingual-side area. The estimation is based on a high probability of the imaging plane being moved to keep the amount of the movement of the imaging plane and the orientation change of the imaging plane to a minimum.

In addition, similar determination is performed for the mandible. Specifically, area detector 101 determines whether the tooth is an anterior tooth, according to output Ay by the acceleration sensor for the y-direction. Specifically, when Ay threshold b, area detector 101 determines that the area is the mandibular front area.

After determining that the area is the mandibular front area, area detector 101 further determines whether the area is the buccal-side area or the lingual-side area, according to output Ax by the acceleration sensor for the x-direction. Specifically, when Ax<0, area detector 101 determines that the area is the mandibular front buccal-side area. When Ax≥0, area detector 101 determines that the area is the mandibular front lingual-side area.

Meanwhile, when the area is not the mandibular front area, area detector 101 determines the orientation of the imaging plane according to output Ax by the acceleration sensor for the x-direction. Specifically, when Ax>0, area detector 101 determines that the area is the mandibular right buccal-side area or the mandibular left lingual-side area. When Ax≤0, area detector 101 determines that the area is the mandibular left buccal-side area or the mandibular right lingual-side area.

When area detector 101 determines whether the area is the mandibular right buccal-side area or the mandibular left lingual-side area, if the previously determined area is one of the mandibular front buccal-side area, the mandibular right buccal-side area, the mandibular right lingual-side area, the maxillary front buccal-side area, the maxillary right buccal-side area, and the maxillary right lingual-side area, area detector 101 estimates that the current area is the mandibular right buccal-side area. If the previously determined area is one of the mandibular front lingual-side area, the mandibular left buccal-side area, the mandibular left lingual-side area, the maxillary front lingual-side area, the maxillary left buccal-side area, and the maxillary left lingual-side area, area detector 101 estimates that the current area is the mandibular left lingual-side area.

When area detector 101 determines whether the area is the mandibular left buccal-side area or the mandibular right lingual-side area, if the previously determined area is one of the mandibular front buccal-side area, the mandibular left buccal-side area, the mandibular left lingual-side area, the maxillary front buccal-side area, the maxillary left buccal-side area, and the maxillary left lingual-side area, area detector 101 estimates that the current area is the mandibular left buccal-side area. If the previously determined area is one of the mandibular front lingual-side area, the mandibular right buccal-side area, the mandibular right lingual-side area, the maxillary front lingual-side area, the maxillary right buccal-side area, and the maxillary right lingual-side area, area detector 101 estimates that the current area is the mandibular right lingual-side area.

In the above processing, one of the maxillary front buccal-side area, the maxillary front lingual-side area, the maxillary right buccal-side area, the maxillary left lingual-side area, the maxillary left buccal-side area, the maxillary right lingual-side area, the mandibular front buccal-side area, the mandibular front lingual-side area, the mandibular right buccal-side area, the mandibular left lingual-side area, the mandibular left buccal-side area, and the mandibular right lingual-side area is determined as the current area.

It should be noted that the above determination algorithm is just an example, and any determination algorithm may be used as long as it is possible to identify the area from output Ax, output Ay, and output Az by the acceleration sensor. For instance, rather than using the values of output Ax, output Ay, and output Az as variables, a secondary variable obtained by appropriately combining output Ax, output Ay, and output Az may be used for the determination. The secondary variable can optionally be set to, for example, Ay/Az, Ax×Ax+Ay×Ay, and Az−Ax. Alternatively, the area may be determined after acceleration information items for the axes, Ax, Ay, and Az are converted into angle information items (orientation angles) α, β, and γ. For instance, the angle of the x-axis relative to the direction of gravity acceleration may be defined as roll angle α, the angle of the y-axis relative to the direction of gravity acceleration may be defined as pitch angle β, and the angle of the z-axis relative to the direction of gravity acceleration may be defined as yaw angle γ. In addition, the threshold used in each determination can be determined from the results of, for example, clinical tests.

In addition, in the above example, the imaging direction is determined from the two imaging directions: the imaging direction in which an image of the buccal side of a tooth is captured and the imaging direction in which an image of the lingual side of the tooth is captured. However, the imaging direction may be determined from three directions including the imaging direction in which an image of the top of a tooth is captured. For instance, it is possible to determine whether the imaging direction is the direction in which an image of the top of a tooth is captured, on the basis of the fact that the imaging plane is more horizontal when an image of the top of a tooth is captured, compared with when an image of the buccal side is captured and when an image of the lingual side is captured.

In addition, in the above example, the target area for image capturing and the imaging direction are determined using the three-axis acceleration sensor of position sensor 90. However, the target area for the image capturing and the imaging direction may be determined using a three-axis gyro sensor. The three-axis gyro sensor, for example, outputs the amount of angle change because of movement around the x-axis, the amount of angle change because of movement around the y-axis, and the amount of angle change because of movement around the z-axis. That is, for the three-axis gyro sensor, the amount of change for each axis is added under the condition that the initial states of the x-axis, the y-axis, and the z-axis are set to given states. Then, the target area for the image capturing and the orientation of the imaging plane of intraoral camera 10 (imaging direction) are determined.

It should be noted that the target area for the image capturing and the orientation of the imaging plane of intraoral camera 10 may be determined by combining the three-axis acceleration sensor and the three-axis gyro sensor.

Operation of identifier 103 is described below in detail. It should be noted that processing for an image data item (one frame included in a dynamic image or one still image) is described below.

First, tooth image generator 104 generates, from at least one image data item, tooth images each showing a tooth. Specifically, tooth image generator 104 detects interdental positions from the image data items by performing, for example, image analysis and extracts tooth images by using the detected interdental positions. For instance, tooth image generator 104 generates a tooth image by extracting an image by using an interdental position as a boundary.

Next, type identifier 105 identifies the type and position of a tooth included in each tooth image by using area information, user information, reference data, and estimation model 106.

The reference data is referenced when the type and position of the tooth included in the tooth image are identified. For instance, the reference data is tooth data in which the type and the position of each tooth are already known. Specifically, the reference data may be a group of pre-captured tooth image data items, a group of dentition image data items, or a panoramic dentition image. Alternatively, the reference data may be information indicating the standard shape of each tooth or the standard amount of features of each tooth.

It should be noted that reference data items may be classified not only by the type and the position, but also for each imaging direction and for each user attribute. It should be noted that the user attribute is one of the gender, age group (or age), and race of the user or a combination of at least two of the gender, the age group (or age), and the race. That is, the user attribute is uniquely determined by the gender, age group, and race of the user.

Figure 19:
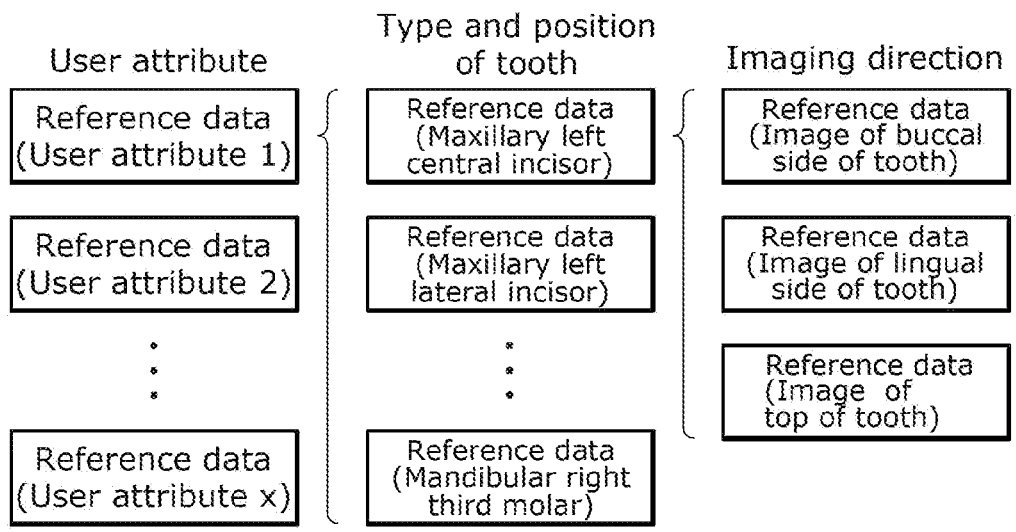
FIG. 19 illustrates an example of classification of reference data items according to the embodiment.
Figure 20:
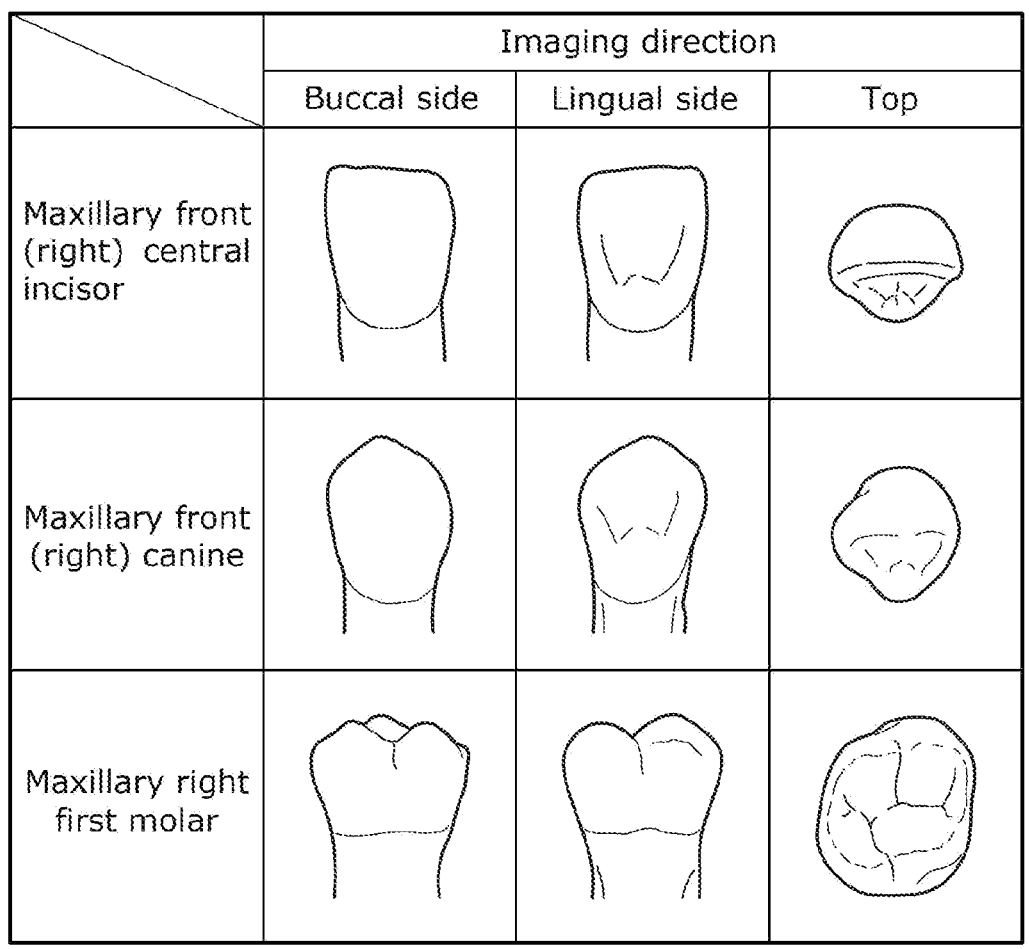
FIG. 20 illustrates examples of reference data items according to the embodiment.

FIG. 19 illustrates an example of classification of reference data items. It should be noted that although FIG. 19 illustrates hierarchical classification of the reference data items, the reference data items do not necessarily have to be hierarchically classified. In addition, reference data items used for identification are expressed as A(n). Furthermore, n is uniquely associated with a set of the type and position of a tooth and an imaging direction. FIG. 20 illustrates examples of the reference data items. As an example, FIG. 20 illustrates reference data items regarding the buccal side, the lingual side, and the top of each of a maxillary incisor, a maxillary canine, and a maxillary first molar.

As illustrated in FIG. 20, the shape and size of a tooth is different by the type of the tooth. For example, the maxillary central incisors have the following features. The typical external shape of the buccal side of a maxillary central incisor is vertically long trapezoidal, and the incisal edge of the central incisor is almost straight. The cervical line is convex toward the tooth root, and the mesial margin and the distal margin of the tooth are slightly curved. The curvature apex of the mesial margin is at or near the mesio-incisal angle. The curvature apex of the distal margin is at the position equivalent to one third of the length of the distal margin in the direction from the incisal edge toward the gingiva. The external shape of lingual-side of the tooth is triangular, and the mesial and distal marginal ridges and the linguocervical ridge (cingulum) form a marginal ridge, which forms a lingual fossa.

In addition, the maxillary canines have the following features. The typical external shape of the buccal side of a maxillary canine is pentagonal, and the maxillary canine has an elevation in the center of the incisal edge, which forms a cusp tip. The cervical line is convex toward the tooth root. The mesial margin of the tooth is straight or is slightly outwardly convex, and the distal margin of the tooth is straight or is slightly concave. The external shape of lingual-side of the tooth is rhomboid, and the mesial and distal marginal ridges and the linguocervical ridge (cingulum) form a marginal ridge.

In addition, the maxillary first molars have the following features. The typical external shape of the buccal side of a maxillary first molar is trapezoidal, and the mesial margin and the distal margin of the tooth are almost straight. The cervical line is horizontal, and a center portion of the cervical line has a projection at the furcation. The mesial contact point is at the position equivalent to one third of the height of the occlusal surface. The distal contact point is at the position equivalent to half the height of the occlusal surface. The external shape of lingual-side of the tooth is trapezoidal, and the lingual surface groove longitudinally runs through substantially the center. The external shape of the top of the tooth is parallelogrammatic, and the bucco-lingual diameter is greater than the mesio-distal diameter.

The tooth image to be processed is expressed as B(m). Thus, tooth images of the teeth next to the tooth included in the tooth image to be processed are expressed as B(m−1) and B(m+1).

In addition, area information corresponding to tooth image (B(m)) to be processed, which has been detected by area detector 101, is expressed as C(m). For instance, an area information item is generated for each image data item. Thus, when one image data item includes two or more teeth and two or more tooth images are generated, the two or more tooth images are associated with the same area information item corresponding to the one image data item.

Figure 21:
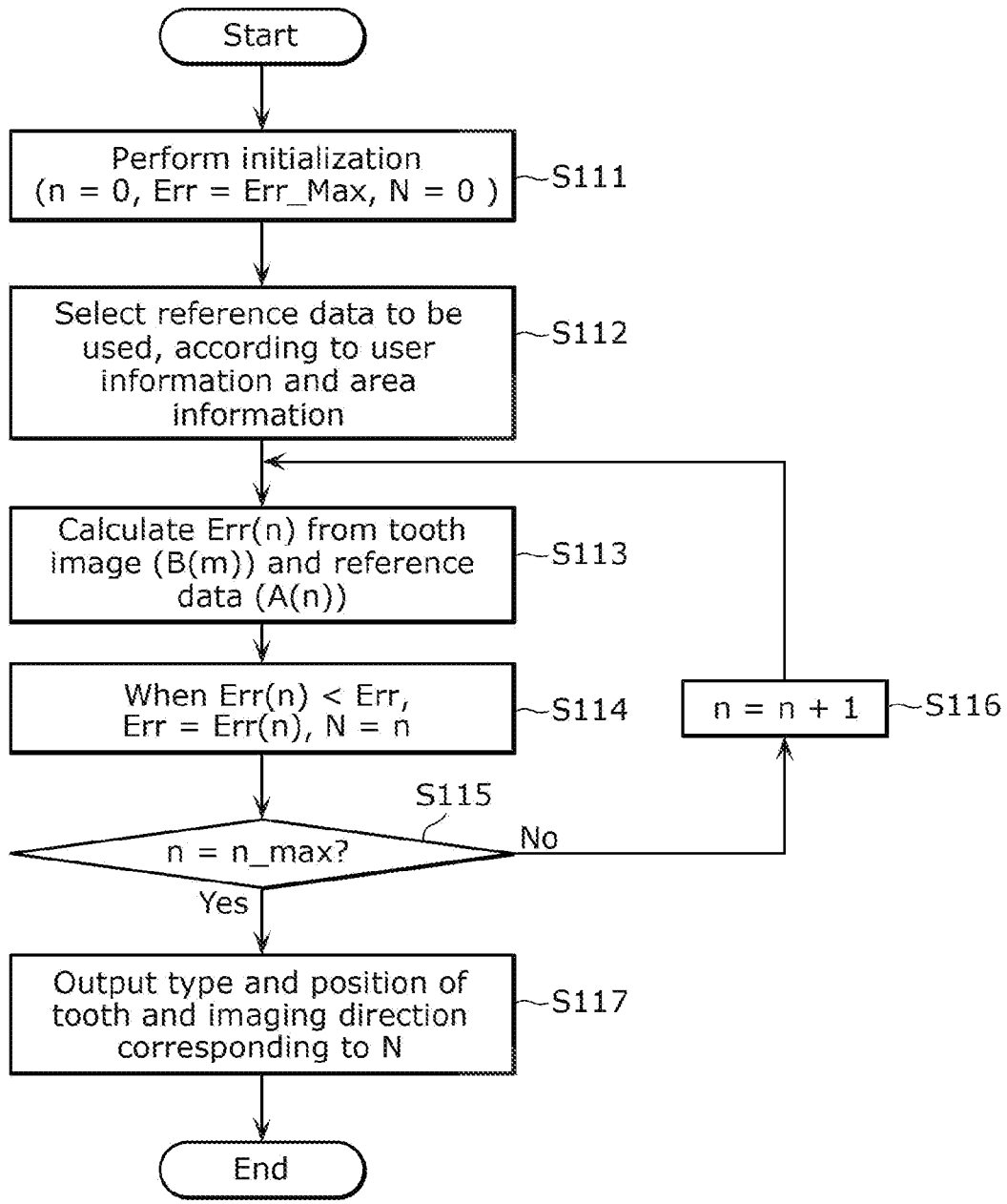
FIG. 21 is a flowchart illustrating type identification processing according to the embodiment.

FIG. 21 is a flowchart illustrating type identification processing performed by type identifier 105. First, type identifier 105 performs initialization (S111). Specifically, type identifier 105 sets n to 0, Err to Err_Max, and N to 0. Here, Err is an evaluation value, which is described later, and the smaller the value of Err, the higher the evaluation. In addition, Err_Max is the theoretical maximum value of Err. Furthermore, N denotes the minimum value of n of Err.

Next, type identifier 105 selects reference data items to be used, according to user information and area information (S112). Specifically, type identifier 105 selects reference data items to which a user attribute indicated by the user information is assigned and the types and positions of teeth and the imaging direction corresponding to an area indicated by the area information are assigned. When for instance the area indicated by the area information is the maxillary left lingual-side area, a total of five reference data items regarding the lingual side of the five teeth included in the maxillary left area are selected as reference data items to be used. In addition, n_max, which is the maximum value of n, is set according to the number of selected reference data items.

For instance, when the number of the reference data items is five, n=0 to 4 is assigned to the five reference data items, and n_max is set to 4.

Then, type identifier 105 calculates Err(n) from tooth image B(m) and reference data (A(n)) (S113). For instance, type identifier 105 calculates Err(n) by using Err(n)=f(A(n))−f(B(m)). Here, f(A(n)) is a value when A(n) is put into function f( ), and f(B(m)) is a value when B(m) is put into function f( ). Function f( ) is a function to extract the amount of features of each of A(n) and B(m). It should be noted that f( ) may be expressed as a vector instead of a scalar.

As illustrated in FIG. 20, each tooth has a distinctive shape and size according to the type of the tooth. By using function f described above, type identifier 105 extracts the distinctive shape and size of each tooth as the amount of features.

Figure 22:
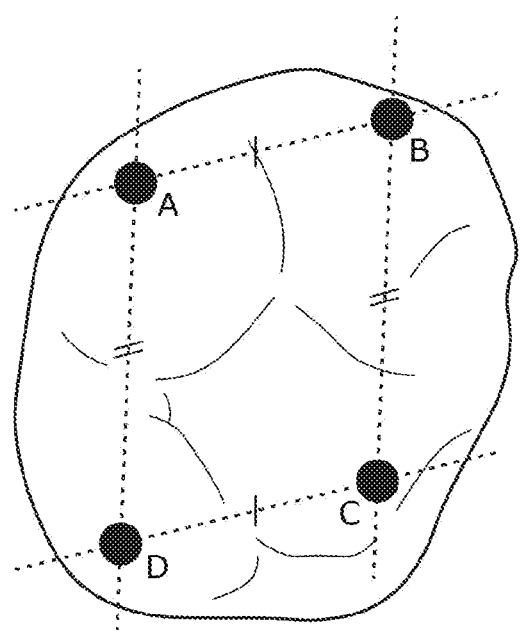
FIG. 22 illustrates an example of a tooth image according to the embodiment.

The amount of features extracted by using function f is described with reference to FIG. 22. FIG. 22 illustrates an image of the top of the maxillary right first molar. The occlusal surface of the first molar has a shape close to a parallelogram, and line AB connecting the mesial lingual cusp tip to the mesial buccal cusp tip is close to parallel to line DC connecting the distal lingual cusp tip to the distal buccal cusp tip. Line AD is close to parallel to line BC. In addition, the distances between the cusp tips are substantially equal (AB=DC, AD=BC). As an example, the above two distances between the cusp tips can be used as the amount of features.

In addition, Err(n) is a value denoting a difference (distance in the case of a vector) between f(A(n)) and f(B(m)). That is, the closer B(m) is to A(n), the smaller "f1(A(n))−f1(B(m))" is. When n=m, Err(n) has a local minimum value.

When calculated Err(n) is smaller than Err, type identifier 105 sets Err to Err(n) and N to n (S114).

When n #n_max (No in S115), type identifier 105 increments n by 1 (S116) and performs step S113 and the subsequent steps again. That is, steps S113 and S114 are performed for all the reference data items used.

When n=n_max (Yes in S115), type identifier 105 outputs the type, the position, and the imaging direction corresponding to N, as the type, the position, and the imaging direction of a tooth included in the tooth image (S117).

Through the processing, type identifier 105 can identify the type, position, and imaging direction of the tooth included in the tooth image. In addition, in step S112, it is possible to narrow down candidates which are combinations of tooth types, tooth positions, and imaging directions, by using the user information and the area information. Thus, it is possible to reduce the amount of processing and improve the accuracy of identification.

Figure 23:
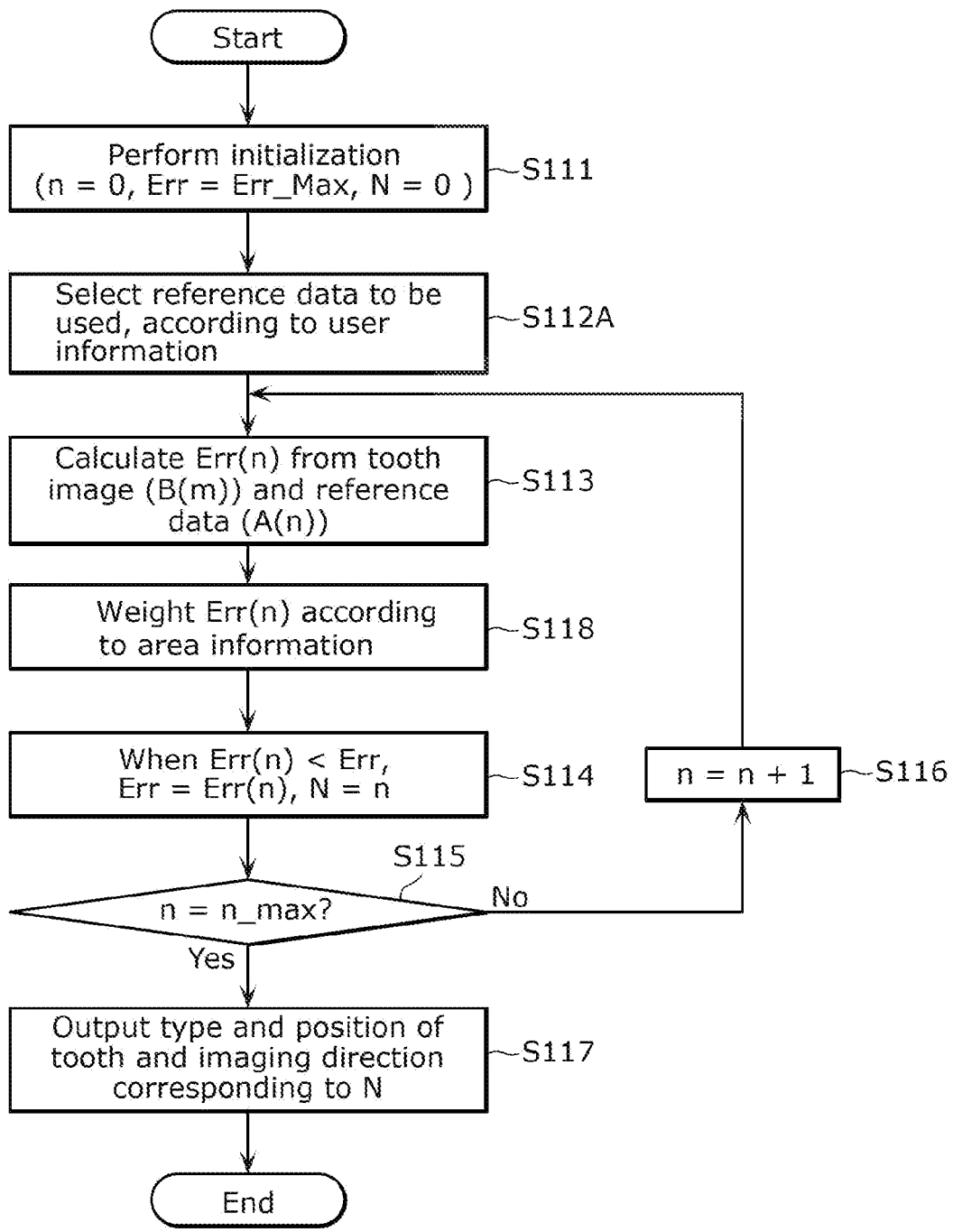
FIG. 23 is a flowchart illustrating another example of the type identification processing according to the embodiment.

FIG. 23 is a flowchart illustrating another example of the type identification processing performed by type identifier 105. In the processing illustrated in FIG. 23, step S112 illustrated in FIG. 21 is changed to step S112A, and step S118, which is not included in the processing illustrated in FIG. 21, is added.

In step S112A, type identifier 105 selects reference data items to be used, according to the user information. Specifically, type identifier 105 selects reference data items to which a user attribute indicated by the user information is assigned.

In step S118, type identifier 105 weights Err(n) calculated in step S113, according to the area information. Specifically, type identifier 105 multiplies Err(n) by w suitable for the area information. When for instance an area indicated by the area information includes the tooth corresponding to n, Err(n) is multiplied by w0. When for instance the area indicated by the area information does not include the tooth corresponding to n, Err(n) is multiplied by w1 greater than w0. This causes Err of the tooth included in the area indicated by the area information to be smaller, which increases the possibility of the tooth included in the tooth image being determined as the tooth included in the area.

In addition, weighting does not have to include two steps including the determination as to whether the area includes the tooth corresponding to n. For instance, weight may be set according to the distance from the area indicated by the area information. For instance, the weight of a tooth close to the area indicated by the area information may be set to be smaller than the weight of a tooth far from the area.

In addition, rather than using the user information for selecting reference data items, the user information may be used for weighting Err (n), as with the area information.

In addition, selection of reference data items according to the area information, as described with reference to FIG. 21 and weighting described with reference to FIG. 23 may be combined. For instance, a tooth far from the area indicated by the area information may be removed from the target, and weighting may be used for a tooth close to the area.

In addition, when tooth images of the user are obtained before, for example, in a case where the user regularly takes intraoral images, the tooth images may be used as reference data items. In this case, selection of reference data items according to the user information is not performed, and only the processing based on the area information is performed.

In addition, in the above example, a tooth image to be processed and reference data items are compared. However, two or more tooth images corresponding to a row of teeth including a tooth included in a tooth image to be processed and two or more reference data items may be compared.

For instance, type identifier 105 may calculate Err(n) by Err(n)=f(A(n))−f(B(m))+f'(A(n−1))−f'(B(m−1))+f'(A(n+1))−f'(B(m+1)). Here, A(n−1) and A(n+1) are reference data items on the teeth next to the tooth corresponding to A(n). B(m−1) and B(m+1) are the tooth images of the teeth next to the tooth corresponding to B(m). In addition, f'( ) is a function for extracting the amount of features to evaluate teeth on both sides of a tooth of interest. It is possible to improve the accuracy of identification by using the information on the teeth next to the tooth of interest in this way.

In addition, in the above example, a tooth image is used as a reference data item. However, the amount of features (that is, the value of f(A(n)) may be used as a reference data item.

Estimation model 106 used for identification by type identifier 105 may include a learned model, such as a neural network. For instance, function f or function f', which is described above, may be the learned model. In addition, the method of using a neural network is not limited to the above example. For instance, whole estimation model 106, which estimates the type of a tooth, may be a neural network. In this case, for instance, estimation model 106 may be provided for each user attribute. Each estimation model 106 is a learned model generated by machine learning using, as training data items (learning data items), sets of a tooth image, area information, the type and position of a tooth, and the imaging direction for the user attribute corresponding to the estimation model. When a tooth image and area information are input to estimation model 106, estimation model 106 outputs the type and position of the tooth and the imaging direction. In this case, type identifier 105 selects corresponding estimation model 106 by using user information and inputs a tooth image and area information to selected estimation model 106 to obtain the type and position of a tooth and the imaging direction.

Alternatively, estimation model 106 may be provided for each set of user attribute and area information. In this case, each estimation model 106 is a learned model generated by machine learning using, as training data items, sets of a tooth image, area information, and the type and position of a tooth, and the imaging direction for the set of user attribute and area information corresponding to the estimation model. When a tooth image is input to estimation model 106, estimation model 106 outputs the type and position of a tooth and the imaging direction. In this case, type identifier 105 selects corresponding estimation model 106 by using user information and area information and inputs a tooth image to selected estimation model 106 to obtain the type and position of a tooth and the imaging direction.

It should be noted that in the example described above, both user information and area information are used. However, only one of the user information and the area information may be used.

In addition, in the example described above, area information indicates an area and an imaging direction. However, the area information may indicate only one of the area and the imaging direction.

Figure 24:
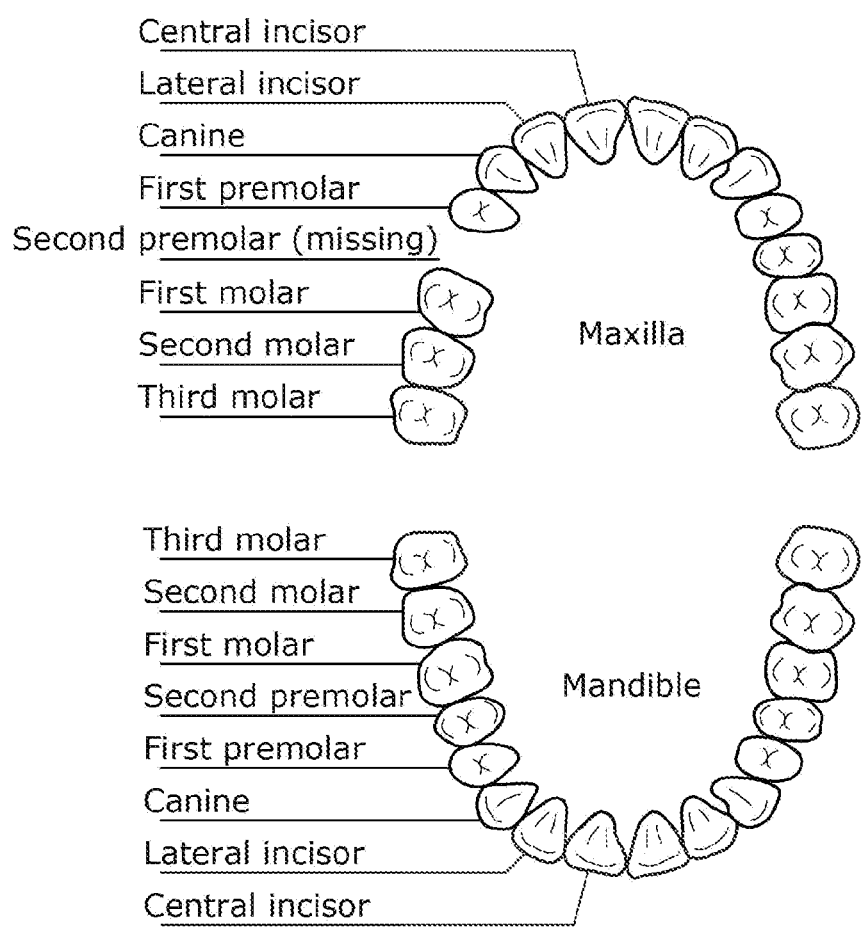
FIG. 24 illustrates a user's intraoral condition where a tooth is missing, according to the embodiment.

Operation of identifier 103 of the intraoral camera system performed when, for instance, a tooth (e.g., the maxillary left second premolar) of the user is missing because of treatment for a decayed tooth is described below in detail. It should be noted that processing for an image data item (one frame included in a dynamic image or one still image) is described below. FIG. 24 illustrates the user's intraoral condition where the maxillary left second premolar is missing.

Area detector 101 identifies that intraoral camera 10 is capturing an image of the maxillary left area including the second premolar. Then, intraoral camera 10 captures image B(m') of a portion corresponding to the second premolar and detects the non-existence of the tooth by, for example, image analysis.

Then, type identifier 105 calculates Err(n) from tooth image B(m'−1), tooth image B(m'+1), and reference data (A(n)), identifies the types and positions of teeth shown in tooth images B(m'−1) and B(m'+1), identifies that B(m') is an image of the area between the maxillary left first premolar and the maxillary left first molar, determines that the second premolar is missing, and outputs the result of the determination.

It should be noted that when the third molar is missing, it is possible to determine that the third molar is missing, by identifying the second molar next to the third molar.

In addition, when tooth images of the user are obtained before, for example, in a case where the user regularly takes intraoral images, the tooth images may be used as reference data items. In this case, it is possible to obtain information on the missing tooth of the user from the results of the previous intraoral-image capturing.

Figure 25:
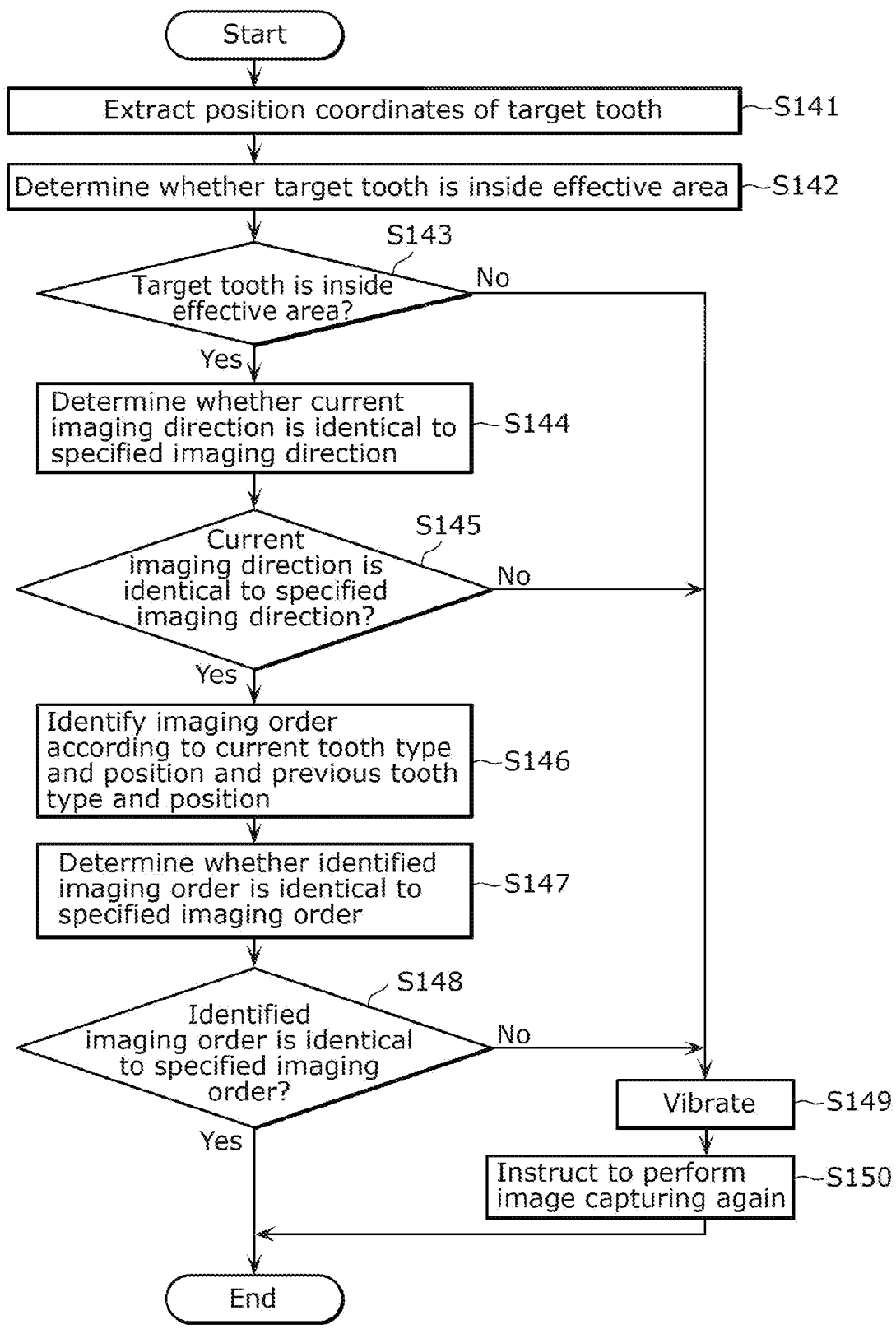
FIG. 25 is a flowchart illustrating effective area determination processing and imaging order determination processing according to the embodiment.

Effective area determination processing for determining whether the tooth is not beyond the effective area (S103) and imaging order determination processing for determining whether the imaging order is correct (S107) are described below in detail. FIG. 25 is a flowchart illustrating the effective area determination processing and the imaging order determination processing.

First, an initializing operation is performed. For instance, vibrating element 91 is turned off. Next, image determination unit 109 extracts the position coordinates of a target tooth for recognition (S141). In other words, the target tooth is a tooth included in the current image data item. Specifically, image determination unit 109 extracts the target tooth included in the image data item and extracts, as position coordinates, the coordinates of the extracted target tooth inside an image.

Then, image determination unit 109 determines whether the target tooth is inside the effective area (S142). Specifically, image determination unit 109 determines whether the position coordinates of the target tooth are inside the effective area.

When the target tooth is not inside the effective area (No in S143), notifier 108 vibrates intraoral camera 10 (S149) and instructs to perform the image capturing again (S150). For instance, portable terminal 70 notifies the user that the image capturing is being performed in a state in which the tooth extends beyond the effective area and displays a message instructing to perform the image capturing again. At this time, notifier 108 may notify the user of the type and/or the position of the tooth extending beyond the imaging area. For instance, notifier 108 may notify the user of the type and/or the position of the tooth identified in the image data item immediately before the current image data item. In addition, regarding the instruction to perform the image capturing again, the instruction may be given so that image capturing is performed again from the notified position, or the instruction may be given so that image capturing is performed again from the starting position in the current step. The notification and the instruction may be given by sound or may be performed by both displaying and producing a sound. In addition, notifier 108 may perform only one of vibrating the intraoral camera (S149) and giving an instruction to perform the image capturing again (S150).

Meanwhile, when the target tooth is inside the effective area (Yes in S143), determination unit 107 determines whether the current imaging direction output by identifier 103 is identical to the specified imaging direction (S144). Here, the specified imaging direction is the imaging direction set for each step, which is described above (e.g., the buccal side, the top, or the lingual side). For instance, when performing the image capturing in step S131 in FIG. 6, the specified imaging direction is the direction in which an image of the buccal side of the dentition is captured.

When the current imaging direction is not identical to the specified imaging direction (No in S145), it is determined that the imaging direction is incorrect. Then, notifier 108 vibrates intraoral camera 10 (S149) and gives the instruction to perform the image capturing again (S150). For instance, portable terminal 70 displays a message instructing the user to perform image capturing in the proper direction (capture images of the buccal side). It should be noted that the instruction may be given by sound or by both displaying and producing a sound. In addition, notifier 108 may perform only one of vibrating the intraoral camera (S149) and giving an instruction to perform the image capturing again (S150).

When the current imaging direction is identical to the specified imaging direction (Yes in S145), it is determined that the imaging direction is correct. Then, determination unit 107 identifies the current imaging order according to the current tooth type and position and the previous tooth type and position (S146). Here, the previous tooth type and position are, for example, the tooth type and position identified immediately before the current tooth type and position are identified.

Next, determination unit 107 determines whether the imaging order is correct by determining whether the identified current imaging order is identical to the specified imaging order (S147). That is, determination unit 107 determines whether scanning of intraoral camera 10 by the user is being properly performed. Here, the specified imaging order is the imaging order set for each step, which is described above (e.g., from the left molar toward the right molar, or the right molar toward the left molar). For instance, the specified imaging order is the imaging order indicated by the arrow illustrated in FIG. 7.

Specifically, when the specified imaging order is the order of n−1, n, n+1 and so on and the position and type immediately before the current position and type correspond to n−1, if the imaging order is correct, the current position and type correspond to n. Thus, if the current position and type correspond to n, determination unit 107 determines that the image capturing is being performed in the proper imaging order. If the current position and type correspond to a number other than n, determination unit 107 determines that the imaging order is incorrect.

When the current imaging order is identical to the specified imaging order (Yes in S148), determination unit 107 does not perform an operation (vibrating element 91 maintains an off-state) and performs S144 and the subsequent steps again for the next tooth.

Meanwhile, when the current imaging order is not identical to the specified imaging order (No in S148), notifier 108 vibrates intraoral camera 10 (S149) and instructs to perform the image capturing again (S150). For instance, portable terminal 70 displays a message instructing the user to perform image capturing in the proper imaging order. It should be noted that the instruction may be given by sound or by both displaying and producing a sound. In addition, notifier 108 may perform only one of vibrating the intraoral camera (S149) and giving an instruction to perform the image capturing again (S150).

In addition, regarding the instruction to perform the image capturing again, the instruction may be given so that image capturing is performed again from the current position (tooth corresponding to n, which is described above), and the instruction may be given so that image capturing is performed again from the starting position in the step. That is, when the image capturing includes two or more steps, notifier 108 may instruct the user to perform the image capturing again from the starting position in the current step. When image capturing is performed again from the current position, notifier 108 continues to vibrate the intraoral camera until an image of the tooth of the correct type and position is captured and stops vibrating the intraoral camera when the image of the tooth of the correct type and position is captured. In this way, notifier 108 may notify the user that the proper scanning is being performed.

It should be noted that in the above example, position information items on tooth images obtained by identifier 103 are used. However, the position information generation method is not limited to the above example. For instance, determination unit 107 may obtain a tooth image and a position information item from an external device.

As described above, the intraoral camera system includes the imaging unit (e.g., intraoral camera 10), a position coordinate extractor (e.g., position information extractor 111), image determination unit 109 (effective area determination unit 112). The imaging unit generates an image data item showing a target tooth for image capturing inside a mouth. The position coordinate extractor defines two-dimensional plane coordinates for the image data item generated by the imaging unit and extracts the position coordinates of the outline of the target tooth from entire imaging area 51 of the imaging unit. When part of the outline of the target tooth is outside effective area S3 set inside entire imaging area 51 of the imaging unit, image determination unit 109 determines that the target tooth extends beyond effective area S3 (imaging area).

Thus, the intraoral camera system can determine whether the tooth extends beyond the effective area. Accordingly, for instance, it is possible to notify the user that the tooth extends beyond the effective area and suggest, for example, performing the image capturing again, which can improve the accuracy of the image capturing. Since the user can readily perform proper image capturing, the user experience improves. Since the intraoral camera system can properly determine whether the tooth extends beyond the effective area, it is possible to improve the accuracy of the image capturing.

For instance, the imaging unit is capable of capturing a series of frames. The intraoral camera system may include notifier 108 that monitors the results of determination by image determination unit 109 during the period from when part of the outline of the target tooth enters entire imaging area 51 until when the part of the outline goes beyond entire imaging area 51, and notifies a user of a failure of the image capturing when the image determination unit determines, for each of image data items corresponding to the series of frames, that the target tooth extends beyond effective area S3.

Thus, when the tooth extends beyond the effective area, the intraoral camera system can notify the user of the failure of the image capturing and suggest, for example, performing the image capturing again. Accordingly, it is possible to improve the accuracy of the image capturing.

For instance, when image determination unit 109 determines, for each of the image data items corresponding to the series of frames, that the target tooth extends beyond effective area S3, notifier 108 notifies the user of the type and/or position of the target tooth.

Since the user can be aware of the tooth extending beyond the effective area, the user can readily perform the image capturing again, for example.

For instance, notifier 108 notifies the user, by vibration, of the failure of the image capturing. In this way, for instance, the user feels the vibrations by their hand holding intraoral camera 10, which enables the user to recognize that an irregular operation has been performed during the scanning. Thus, the user can perform scanning again and perform proper image capturing.

For instance, when image determination unit 109 determines, for each of the image data items corresponding to the series of frames, that the target tooth extends beyond effective area S3, notifier 108 further notifies the user of an instruction to perform the image capturing again.

For instance, the intraoral camera system may further include identifier 103 that identifies, on the basis of the image data items corresponding to the series of frames, the type and/or position of the target tooth when image determination unit 109 determines that the target tooth is not beyond effective area S3 in the series of frames.

For instance, the identifier identifies, on the basis of image data items captured by the imaging unit, the type and the position of each of teeth shown in the image data items. The intraoral camera system further includes a first determination unit (e.g., determination unit 107) that determines whether a first imaging order of the teeth is identical to a predetermined second imaging order, the first imaging order being based on the type and the position identified of each of the teeth shown in the image data items.

Thus, the intraoral camera system can determine that the first imaging order of the teeth being performed differs from the predetermined second imaging order. Accordingly, for instance, it is possible to notify the user that the imaging order is incorrect and suggest, for example, performing the image capturing again, which can improve the accuracy of the image capturing. Since the user can readily perform proper image capturing, the user experience improves.

For instance, when the first determination unit determines that the first imaging order is not identical to the second imaging order, notifier 108 further notifies the user that the imaging order is incorrect. For instance, notifier 108 notifies the user, by vibration, that the imaging order is incorrect. For instance, when the first determination unit determines that the first imaging order is not identical to the second imaging order, notifier 108 further notifies the user of an instruction to perform the image capturing again.

For instance, the intraoral camera system further includes a second determination unit (e.g., determination unit 107) that determines whether a first imaging direction (e.g., the buccal side, the top, or the lingual side) of each of the teeth shown in the image data items is identical to a predetermined second imaging direction (e.g., the buccal side, the top, or the lingual side).

For instance, identifier 103 identifies the type and the position of the tooth, by using estimation model 106 that includes a neural network and outputs the type and the position of the tooth when the image data item is input to the estimation model.

For instance, identifier 103 detects an interdental position from the image data item, generates tooth images each showing a tooth, according to the interdental position detected, and identifies the types and positions of teeth shown in each of the tooth images, according to the tooth images.

For instance, the intraoral camera system further includes user information obtainer 102 that obtains user information indicating at least one of the gender, age group, and race of the user, and identifier 103 identifies the type and the position of the tooth according to the user information and the image data item.

Since the intraoral camera system can perform proper identification according to, for example, the user information, the accuracy of identification improves.

The intraoral camera system according to the embodiment of the present disclosure is described above. However, the present disclosure is not limited to the descriptions in the embodiment.

In addition, the processing units included in the intraoral camera system according to the embodiment are typically embodied as LSIs, which are integrated circuits. The processing units may be made as individual chips, or a part or all of the processing units may be incorporated into one chip.

In addition, circuit integration may be achieved not only by an LSI but also by a dedicated circuit or a general-purpose processor. A field programmable gate array (FPGA), which is an LSI that can be programmed after manufacturing or a reconfigurable processor in which the connections and settings of circuit cells inside an LSI are reconfigurable may be used.

In addition, in the embodiment, each of the structural elements may be dedicated hardware or may be caused to function by executing a software program suitable for the structural element. The structural element may be caused to function by a program executer, such as a CPU or a processor, reading and executing a software program stored in a recording medium, such as a hard disk or semiconductor memory.

In addition, the present disclosure may be embodied as, for example, an image capturing operation determination method performed by the intraoral camera system. In addition, the present disclosure may be embodied as an intraoral camera, a portable terminal, or a cloud server included in the intraoral camera system.

In addition, the configuration of the functional blocks illustrated in each block diagram is a mere example. Two or more functional blocks may be incorporated into one functional block. One functional block may be divided into more than one functional block. A part of the function may be transferred from one functional block to another functional block. The same hardware or software may process the functions of two or more functional blocks having similar functions in parallel or on a time-sharing basis.

The order in which the steps are performed in each flowchart is provided as an example to specifically explain the present disclosure. The steps may be performed in a different order. In addition, a part of the steps and another step may be performed simultaneously (in parallel).

The intraoral camera system and the image capturing operation determination method according to one or more aspects of the present disclosure are described above on the basis of the embodiment. However, the present disclosure is not limited to the descriptions in the embodiment. Within the scope of the present disclosure, the one or more aspects may include one or more embodiments obtained by making various changes envisioned by those skilled in the art to the embodiment and one or more embodiments obtained by combining structural elements in different embodiments.

INDUSTRIAL APPLICABILITY

The present disclosure is usable in an intraoral camera system.

The invention claimed is:

1. An intraoral camera system comprising:
an image sensor that captures a series of frames and generates an image data item showing a target tooth for image capturing inside a mouth;
a processor; and
a memory storing a program, wherein:
the program, when executed by the processor, causes the processor to perform:
defining two-dimensional plane coordinates for the image data item generated by the image sensor and extracts position coordinates of an outline of the target tooth from an entire imaging area of the image sensor;
determining, when part of the outline of the target tooth is outside an effective area set inside the entire imaging area of the image sensor, that the target tooth extends beyond the effective area; and
monitoring results of determination by the determining during a period from when part of the outline of the target tooth enters the entire imaging area until when the part of the outline goes beyond the entire imaging area, and
the intraoral camera system comprises a notifier that notifies a user of a failure of the image capturing when it is determined, for each of image data items corresponding to the series of frames, that the target tooth extends beyond the effective area.

2. The intraoral camera system according to claim 1, wherein when it is determined, for each of the image data items corresponding to the series of frames, that the target tooth extends beyond the effective area, the notifier notifies the user of at least one of a type or a position of the target tooth.

3. The intraoral camera system according to claim 1, wherein the notifier notifies the user, by vibration, of the failure of the image capturing.

4. The intraoral camera system according to claim 1, wherein when it is determined, for each of the image data items corresponding to the series of frames, that the target tooth extends beyond the effective area, the notifier further notifies the user of an instruction to perform the image capturing again.

5. The intraoral camera system according to claim 1, wherein the executed program further causes the processor to identify, based on the image data items corresponding to the series of frames, at least one of a type or a position of the target tooth when it is determined that the target tooth is not beyond the effective area in the series of frames.

6. The intraoral camera system according to claim 5, wherein the executed program causes the processor to identify, based on image data items captured by the image sensor, the type and the position of each of teeth shown in the image data items, and
the executed program further causes the processor to determine whether a first imaging order of the teeth is identical to a predetermined second imaging order, the first imaging order being based on the type and the position identified of each of the teeth shown in the image data items.

7. The intraoral camera system according to claim 6, wherein when it is determined that the first imaging order is not identical to the second imaging order, the notifier further notifies the user that an imaging order is incorrect.

8. The intraoral camera system according to claim 7, wherein the notifier notifies the user, by vibration, that the imaging order is incorrect.

9. The intraoral camera system according to claim 7, wherein when it is determined that the first imaging order is not identical to the second imaging order, the notifier further notifies the user of an instruction to perform image capturing again.

10. The intraoral camera system according to claim 6, wherein the executed program further causes the processor to determine whether a first imaging direction of each of the teeth shown in the image data items is identical to a predetermined second imaging direction.

11. The intraoral camera system according to claim 6, wherein the executed program causes the processor to identify the type and the position of the tooth, by using an estimation model that includes a neural network and outputs the type and the position of the tooth when the image data item is input to the estimation model.

12. The intraoral camera system according to claim 6, wherein the executed program causes the processor to:
detect interdental positions from the image data items,
generate tooth images each showing a tooth, according to the interdental positions detected, and
identify a type and a position of the tooth shown in each of the tooth images, according to the tooth images.

13. The intraoral camera system according to claim 6, wherein:
the executed program further causes the processor to:
obtain user information indicating at least one of a gender, an age group, or a race of the user, and
identify the type and the position of the tooth according to the user information and the image data item.

14. An image capturing operation determination method comprising:
- defining, by a processor, two-dimensional plane coordinates for an image data item generated by an image sensor capturing an image of a target tooth for image capturing inside a mouth and extracting, from an entire imaging area of the image sensor, position coordinates of an outline of the target tooth, the image sensor being configured to capture a series of frames;
- determining, by the processor, when part of the outline of the target tooth is outside an effective area set inside the entire imaging area of the image sensor, that the target tooth extends beyond the effective area;
- monitoring, by the processor, results of determination by the determining during a period from when part of the outline of the target tooth enters the entire imaging area until when the part of the outline goes beyond the entire imaging area; and
- notifying, through a user interface, a user of a failure of the image capturing when it is determined, for each of image data items corresponding to the series of frames, that the target tooth extends beyond the effective area.

* * * * *